(12) United States Patent
Gargaro

(10) Patent No.: US 12,490,899 B2
(45) Date of Patent: Dec. 9, 2025

(54) SYSTEM AND METHOD FOR PREDICTING HEART FAILURE HOSPITALIZATION

(71) Applicant: BIOTRONIK SE & Co. KG, Berlin (DE)

(72) Inventor: Alessio Gargaro, Milan (IT)

(73) Assignee: BIOTRONIK SE & Co. KG, Berlin (DE)

( * ) Notice: Subject to any disclaimer, the term of this patent is extended or adjusted under 35 U.S.C. 154(b) by 880 days.

(21) Appl. No.: 17/638,422

(22) PCT Filed: Jul. 8, 2020

(86) PCT No.: PCT/EP2020/069238
§ 371 (c)(1),
(2) Date: Feb. 25, 2022

(87) PCT Pub. No.: WO2021/037427
PCT Pub. Date: Mar. 4, 2021

(65) Prior Publication Data
US 2022/0296100 A1    Sep. 22, 2022

(30) Foreign Application Priority Data

Aug. 29, 2019  (EP) .................................. 19194272
Dec. 20, 2019  (EP) .................................. 19218569

(51) Int. Cl.
*A61B 5/00* (2006.01)
*A61B 5/02* (2006.01)
(Continued)

(52) U.S. Cl.
CPC .............. *A61B 5/0031* (2013.01); *A61B 5/02* (2013.01); *A61B 5/7275* (2013.01); *A61N 1/3627* (2013.01); *A61N 1/36521* (2013.01)

(58) Field of Classification Search
CPC ....... A61B 5/0031; A61B 5/02; A61B 5/7275; A61B 5/349; A61B 5/0205;
(Continued)

(56) References Cited

U.S. PATENT DOCUMENTS 7,020,521 B1 *   3/2006   Brewer .............. A61N 1/36514
                                                          607/14
7,308,309 B1    12/2007   Koh
(Continued)

FOREIGN PATENT DOCUMENTS

WO        2016130632 A1    8/2016

OTHER PUBLICATIONS

International Search Report (PCT/ISA/210) and Written Opinion (PCT/ISA/237) mailed on Nov. 10, 2020, by the European Patent Office as the International Searching Authority for International Application No. PCT/EP2020/069238.
(Continued)

*Primary Examiner* — Eric F Winakur
*Assistant Examiner* — Noah M Healy
(74) *Attorney, Agent, or Firm* — Buchanan Ingersoll & Rooney PC

(57) ABSTRACT

A system for predicting heart failure hospitalization, comprises a processing device configured to process data derived from signals sensed by an implantable medical device, the signals being indicative of cardiac activity, to obtain a heart failure prediction index. The processing device is configured to process a multiplicity of variables relating to different cardiac characteristics to obtain a multiplicity of processed variables, and to combine the processed variables using a mathematical model to compute the heart failure prediction index.

15 Claims, 9 Drawing Sheets

(51) Int. Cl.
*A61N 1/362* (2006.01)
*A61N 1/365* (2006.01)

(58) Field of Classification Search
CPC ... A61B 5/02405; A61B 5/053; A61B 5/6869; A61N 1/3627; A61N 1/36521
See application file for complete search history.

(56) References Cited

U.S. PATENT DOCUMENTS

| | | | |
|---|---|---|---|
| 2012/0219943 A1* | 8/2012 | Ky | G01N 33/6893 435/7.1 |
| 2013/0053716 A1* | 2/2013 | Zhang | A61N 1/3627 607/18 |
| 2013/0116578 A1 | 5/2013 | An et al. | |
| 2015/0157273 A1 | 6/2015 | An et al. | |
| 2019/0069851 A1 | 3/2019 | Sharma et al. | |

OTHER PUBLICATIONS

First European Examination Report for European Application No. 20736711.1 dated Jan. 30, 2025.
Arash Arya, et al., "Influence of Home Monitoring on the clinical status of heart failure patients: Design and rationale of the IN-TIME study", European Journal of Heart Failure 10 (2008) 1143-1148, www.elsevier.com/locate/ejheart; 2008 European Society of Cardiology.

* cited by examiner

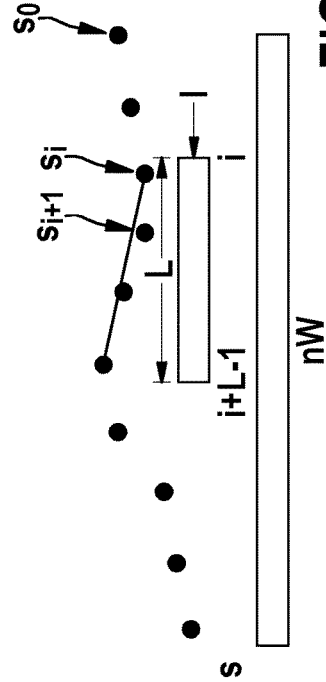
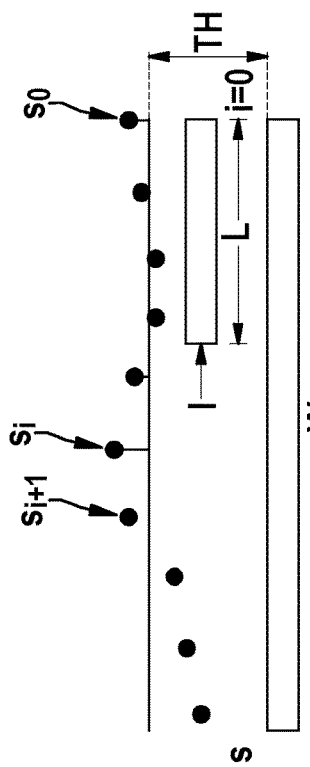
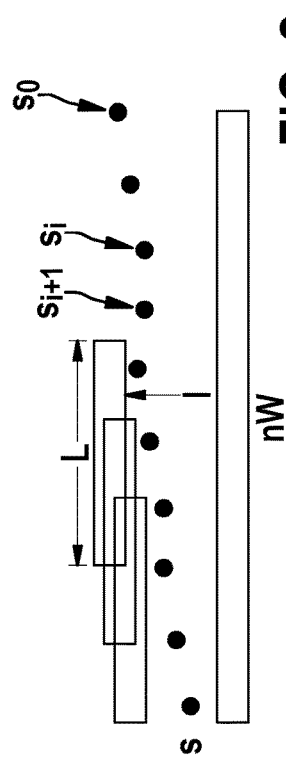
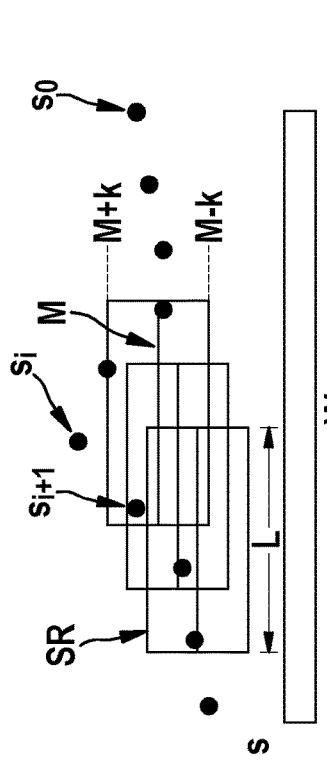
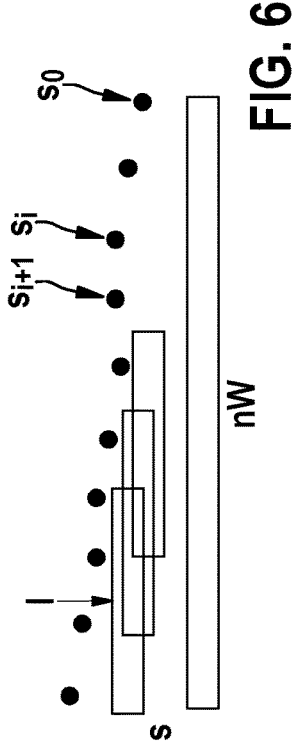

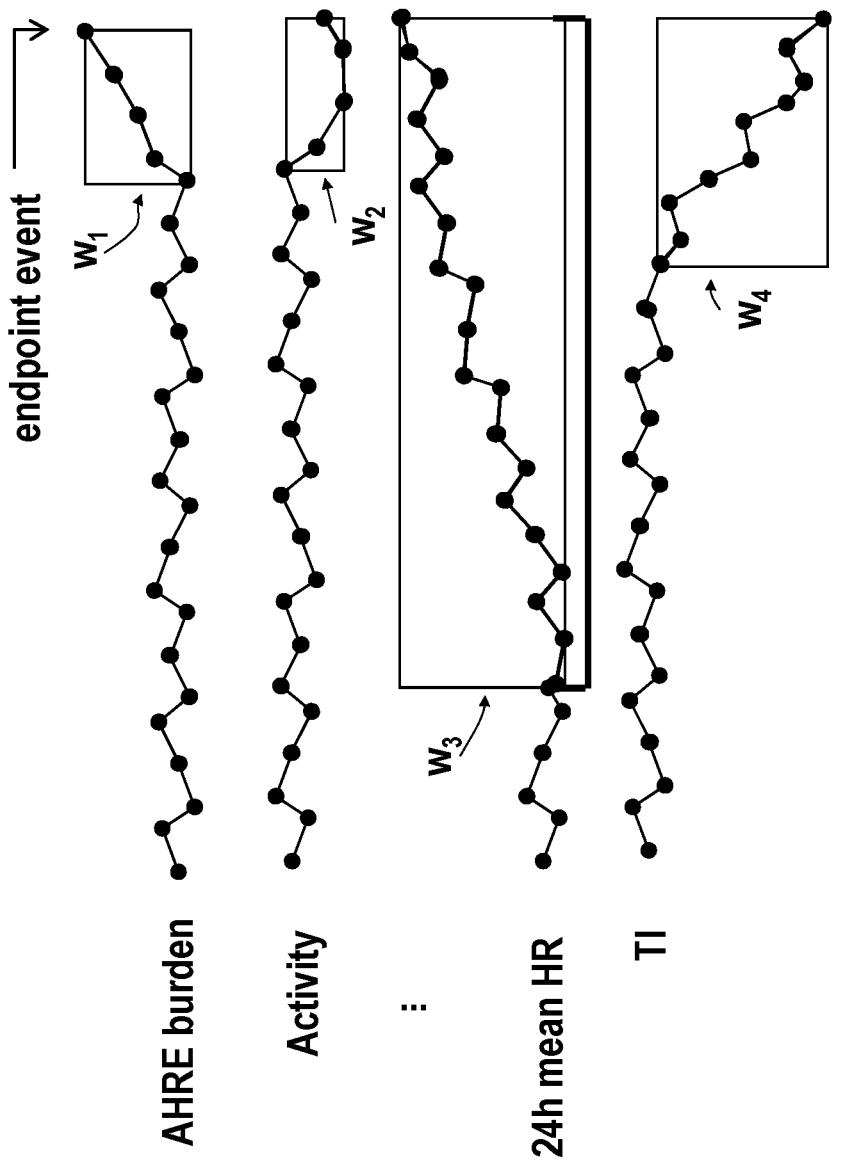

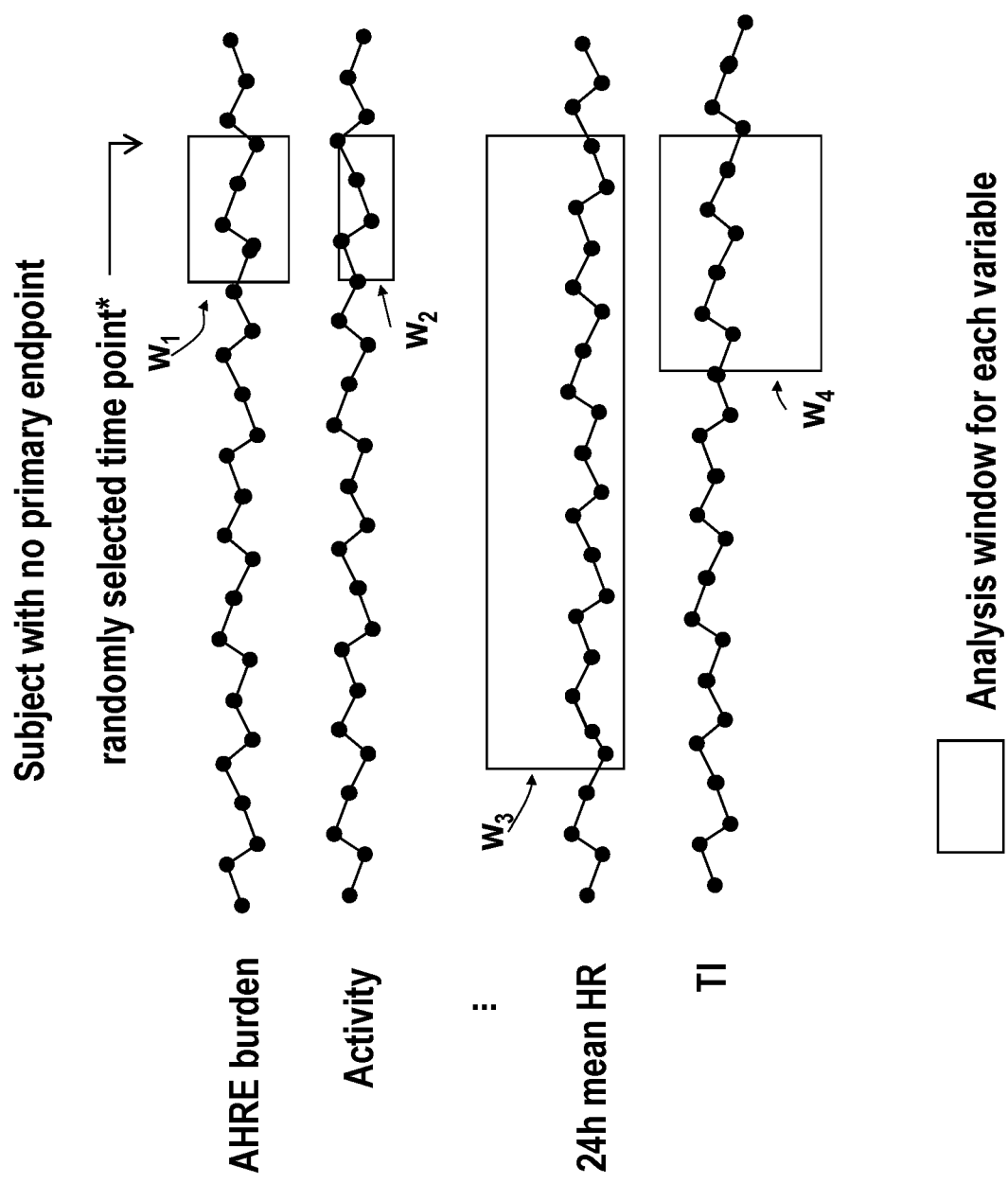

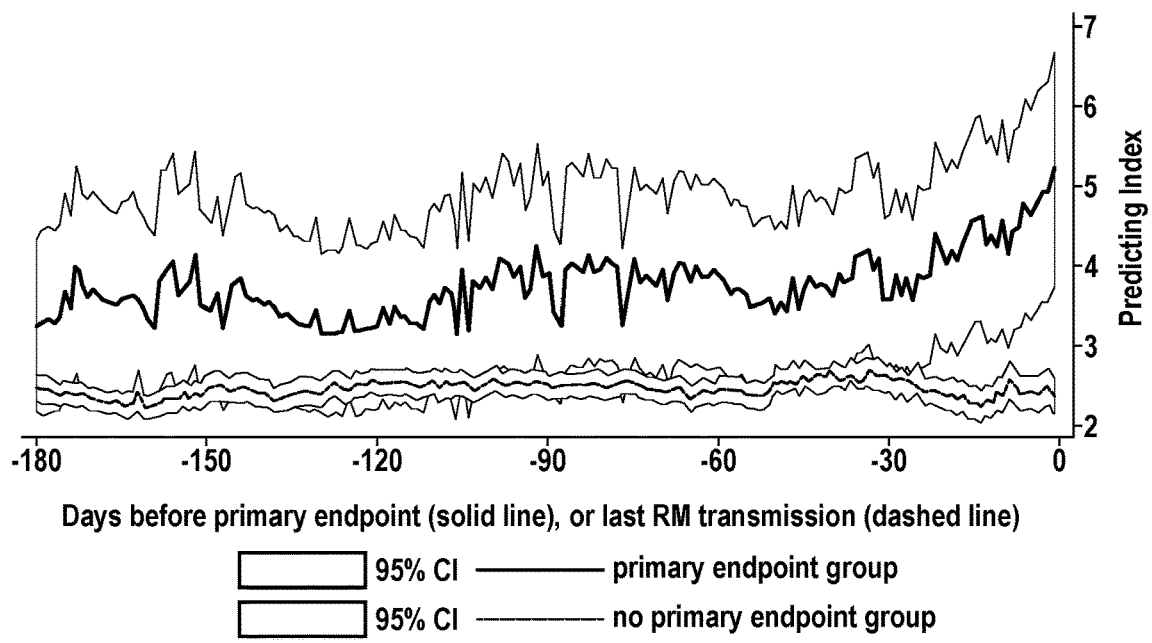
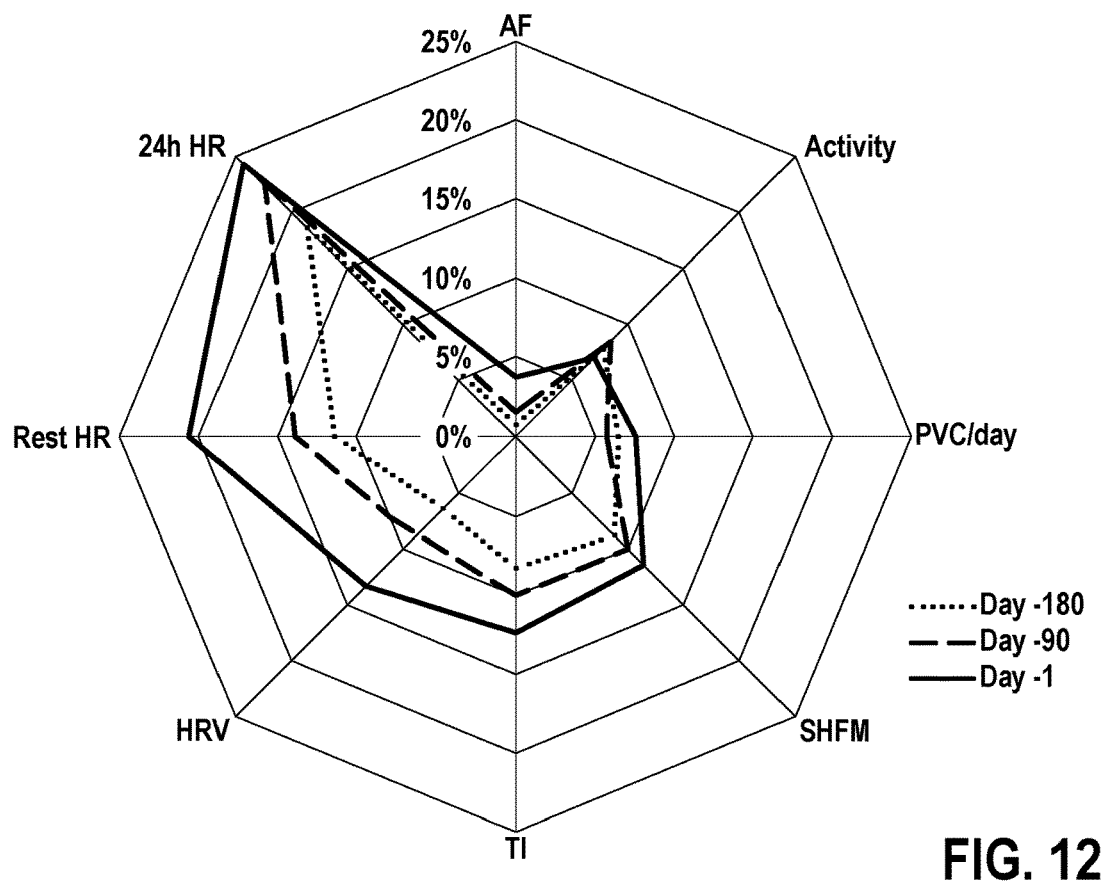
FIG. 12

SYSTEM AND METHOD FOR PREDICTING HEART FAILURE HOSPITALIZATION

CROSS-REFERENCE TO RELATED APPLICATIONS

This application is the United States National Phase under 35 U.S.C. § 371 of PCT International Patent Application No. PCT/EP2020/069238, filed on Jul. 8, 2020, which claims the benefit of European Patent Application No. 19218569.2, filed on Dec. 20, 2019 and European Patent Application No. 19194272.1, filed on Aug. 29, 2019, the disclosures of which are hereby incorporated by reference herein in their entireties.

TECHNICAL FIELD

The instant invention relates to a system for predicting heart failure hospitalization comprising the features of claim 1 and a method for predicting heart failure hospitalization.

BACKGROUND

A system of this kind comprises a processing device configured to process data derived from signals sensed by an implantable medical device, such signals being indicative of cardiac activity, to obtain a heart failure prediction index.

Generally, implantable medical devices, such as cardiac stimulation devices, for example pacemaker devices, intra-cardiac defibrillator (ICD) devices and cardiac resynchronization therapy (CRT-D) devices may be embedded within a home monitoring system, the home monitoring system allowing for a remote monitoring (RM) of a patient's conditions by analyzing sense data obtained from an implanted medical device. In particular, an implanted device such as an ICD device or a CRT-D device may obtain sensor signals relating to cardiac activity in the atrium and the ventricle of the patient's heart, which may be transmitted to a patient device using a common communication scheme, such as an MICS scheme, allowing then to send the data on to a server device which may process the data and may allow access to the data by a clinician from a remote site.

There is a desire to be able to derive a prognosis for a heart failure event making use of data obtained from an implanted medical device within a home monitoring system, the home monitoring system allowing to transmit and process data such that information derived from the data can be made available to a clinician.

Despite improvements in treatments over the last 30 years, heart failure (HF) remains associated with poor prognosis and unsatisfactory re-hospitalization rates. According to recent European data, 44% of hospitalized HF patients are readmitted for any cause within the subsequent 12 months. Therapies for acute HF do not halt general progression of the disease, whereas each HF hospitalization confers a decreasingly poor prognosis. Therefore early prevention of first acutely decompensated HF events is a key strategy to improve outcome.

Several multi-parametric risk scores have been developed for mortality prediction, their ability in predicting worsening HF hospitalizations within timeframes allowing early interventions however apparently being limited. Risk scores are generally based on baseline or cross-sectional markers which are difficult to collect and difficult to update with adequate frequency.

In the subset of HF patients with reduced ejection fraction and indication to implantable defibrillator (ICD) and/or cardiac resynchronization therapy (CRT) several HF-related diagnostics are continuously monitored by the implanted devices. The information has been used to construct longitudinal predictors based on a number of device-diagnostics parameters. However, controlling for inappropriate alert rate is crucial for larger scale adoption in routine care.

In this respect, there is a general desire for a system and a method for predicting heart failure hospitalization, which allows for an increased sensitivity and an improved specificity. The sensitivity herein indicates the ability of a prognostic system and method to reliably predict the occurrence of a heart failure event. In particular, the sensitivity indicates the probability that the system and method provides for a correct alert if a true heart failure condition occurs. In turn, the specificity indicates the ability of a prognostic system to correctly identify that no heart failure condition is present. In particular, the specificity indicates the probability for no alert in case there truly is no heart failure condition present. It is desired that a system and method for predicting heart failure hospitalization has a high sensitivity as well as a high specificity, such that a true heart failure condition is correctly identified and leads to an alert, while at the same time in cases that no heart failure condition is present no false alert is triggered.

The present disclosure is directed toward overcoming one or more of the above-mentioned problems, though not necessarily limited to embodiments that do.

SUMMARY

An object of the present invention to provide a system and method for predicting heart failure hospitalization allowing for a prediction with an increased sensitivity and specificity.

At least this object is achieved by means of a system comprising the features of claim 1.

Accordingly, the processing device is configured to process a multiplicity of variables relating to different cardiac characteristics to obtain a multiplicity of processed variables, and to combine such processed variables using a mathematical model to compute said heart failure prediction index.

By means of the system, data is obtained and processed making use of an implantable medical device, for example a cardiac stimulation device, such as an ICD device or a CRT-D device. In an implanted state, the medical device is able to sense signals which relate to cardiac activity, for example atrial and ventricular activity, such that from the signals obtained from the implanted medical device different variables may be derived which may be used to determine a heart failure prediction index.

The heart failure prediction index herein shall give a probability for a heart failure event within a predefined following (future) time period, for example within a multiplicity of days, for example within the next 30 to 90 days. Based on the heart failure prediction index, hence, it may be monitored whether a heart failure event within a specific patient is likely to occur, such that it may be decided whether a hospitalization of the patient is required. Based on the heart failure prediction index an alert may be triggered, for example in case the heart failure prediction index exceeds a predefined threshold.

For determining the heart failure prediction index, a multistep procedure is employed. Namely, in a first step data points relating to a multiplicity of variables are processed to obtain processed variables. The processed variables are then, in a second step, combined in a mathematical model in order to compute the heart failure prediction index. Hence, in a first step variables are processed individually to come up with processed variables, for example being indicative of certain trends within series of data points over a defined time range, for example multiple past days, for example a past time range ranging between 30 days to 150 days, for example the last 90 days. In the second step, then, the individually processed variables are combined in order to derive a single score, which gives the probability of a heart failure event in a future time range.

The variables which are processed may include, for example, a mean ventricular heart rate parameter, a mean number of extrasystoles parameter, a mean ventricular heart rate at rest parameter, a burden of atrial arrhythmias parameter, a heart rate variability parameter, a patient activity parameter, and/or a thoracic impedance parameter.

The mean ventricular heart rate parameter for one day may be derived, for example, by averaging the ventricular heart rate (MVHR) over a time period of 24 hours. Hence, the mean ventricular heart rate parameter indicates the mean ventricular heart rate over one day.

The mean number of ventricular extrasystoles (PHC/h) parameter indicates the frequency of extrasystoles averaged over one day. For determining this parameter, the number of extrasystoles over one day is counted and divided by 24 hours.

The mean ventricular heart rate at rest (MVHRR) parameter for one day is determined by observing the mean ventricular heart rate during night hours, that is at times when a patient usually is asleep, e.g., between 12 pm and 5 am.

The burden of atrial arrhythmias parameter for one day is computed by summing time periods for one day in which arrhythmias are present and by dividing the sum time of arrhythmias by 24 hours. Arrhythmias herein are assumed to be present, as it is conventionally defined, if atrial signals indicate a faster activity than ventricular signals, wherein the atrial signals exceed a defined threshold (200 bpm), which usually is output by the implanted medical device.

The heart rate variability parameter usually corresponds to the PP variability, that is, the variability in the interval between atrial P waves. The variability is determined by the standard deviation of the PP intervals.

The patient activity parameter is, for example, derived from an accelerometer sensor as present within the implanted medical device or within another device of the patient, the accelerometer indicating movement of the patient. The patient activity parameter for one day herein is computed by summing the times which the sensor indicates movement and by dividing the combined time over 24 hours.

The thoracic impedance parameter indicates the thoracic impedance as measured between an electrode implanted in the patient's heart and the device can.

Generally, within a home monitoring system values for the different variables are obtained regularly, wherein, for example, one or multiple values per day are derived according to measurement data obtained from the implanted medical device. Hence, a series of data points for each variable exists, the data points ranging over a multiplicity of days. For deriving the heart failure prediction index, herein, it may be looked at a predefined number of data points for each variable, for example for data points over a predefined number of days, for example a number between 30 and 150 days, for example the last 90 days. Hence, to process the different variables, it is looked at data points of the variables in a previous, defined time range, for example within the last 90 days. Such data points of each variable are processed to derive an actual processed value for the variable, which then is fed into the mathematical model in order to compute the heart failure prediction index.

By processing a series of data points for each variable and hence by processing data relating to a previous time span, trends within the different series of data points of the different variables may be identified, such trends indicating a possible change in the heart condition of the patient, such that a likelihood for a heart failure event in the near future may be obtained. Hence, from the different series of data points relating to the different variables certain trend characteristics may be identified, which may then be combined to come up with an overall score indicating the likelihood for a heart failure event.

In one embodiment, prior to processing a series of data points relating to a particular variable, a moving average filter may be applied to the series, such that the series is smoothed. A moving average filter herein may employ a lag in the range of, for example, 4 to 8 data points.

In one embodiment, the processing device is configured, for the processing, to process intervals within the series of data points, each interval comprising a subset of the series of data points. Hence, for a series of data points relating to a particular variable, it is looked at intervals within the series comprising a predefined number of data points, wherein an analysis, in particular a statistical analysis, may be applied to the data points within the particular interval. By looking at the intervals, trends in subsets of the overall series may be identified, wherein from those trends in the intervals conclusions may be drawn to derive a value for the processed variable.

In one embodiment, the processing device is configured, for the processing, to identify intervals containing monotonically increasing data points or monotonically decreasing data points. Hence, within intervals of a series of data points relating to particular variable it is looked at whether data points within a particular interval are monotonically increasing or, alternatively, monotonically decreasing. To derive the processed variable, then, for example the number of intervals within the series of data points which (only) contain monotonically increasing or monotonically decreasing values may be counted.

Alternatively, a slope for data points within an interval may be determined in order to derive a processed variable for a particular variable. For example, it may be looked at an interval within a series of data points relating to a particular variable which contains the most recent data points, wherein then the slope for these recent data points may be determined.

Again alternatively, a number of data points within an interval which fall outside a stability range may be determined in order to derive the processed variable. Hence, a stability range defined, and for different intervals within a series of data points relating to a particular variable it is determined how many data points fall outside the stability range. By determining the number of outliers hence it can be determined whether a series of data points overall is stable in that it contains a small number of outliers, or must be regarded as instable because it contains a fairly large number of outliers.

Yet alternatively, a number of data points within an interval which exceed a predefined threshold may be determined. For example, it may be looked at an interval containing the most recent data points, wherein for these data points it is determined how many of the data points exceed the threshold.

In one embodiment, for each of the different variables which are considered and processed a particular processing scheme using a particular function is employed. This is based on the finding that based on different trends in the different variables different conclusions with respect to a likelihood for a heart failure event may be drawn, such that different functions should be employed for processing the different variables and to derive different processed variables to go into the mathematical model for determining the overall heart failure prediction index.

For example, in one embodiment, a series of data points of a first variable relating to the mean ventricular heart rate parameter may be processed to obtain a first processed variable by identifying intervals in a series of data points containing monotonically increasing values, satisfying a condition $s_i \geq s_{i+1} \geq s_{i+2} \geq \ldots \geq s_{i+L-1}$, wherein $s_i \ldots s_{i+L-1}$ are data points in an interval having a length of L data points. Hence, a series of data points, containing, for example, approximately one data point per day (dependent on whether a transmission of data has been successful on a particular day or not), is processed by looking at moving intervals within the series of data points and by determining whether a particular interval contains monotonically increasing values. The number of intervals within the series of data points which contain only monotonically increasing data points may be counted, the overall number of intervals containing monotonically increasing values yielding the value for the processed variable.

The length of the interval may, for example, be determined by dividing the overall number of data points in the series of data points (i.e. the number of data points available for a predefined number of days, e.g. 90 days) by a predefined number, for example ranging from 9 to 45. For example, the length of the interval may be determined by dividing the overall number of data points by 30.

In one embodiment, a series of data points of a second variable relating to the mean number of ventricular extrasystoles parameter is processed to obtain a second processed variable by computing a slope of data points in an interval. For this, for example a moving averaging filter may be applied to the series of data points first. Then, the slope of, for example, the most recent interval, i.e. the interval containing the most recent data point (i=0), may be determined.

The length of the interval may, for example, be determined by dividing the overall number of data points in the series of data points (i.e. the number of data points available for a predefined number of days, e.g. 90 days) by a predefined number, for example ranging from 1 to 3. For example, the length of the interval may be determined by dividing the overall number of data points by 2.

In one embodiment, a series of data points of a third variable relating to the mean ventricular heart rate at the rest parameter is processed to obtain a third processed variable by determining a number of data points within an interval which fall outside a stability range associated with the interval. Hence, for the mean ventricular heart rate at rest it is looked at how stable the heart rate at rest is over the time range of interest, which is observed by applying a stability range. The stability range may, for example, be determined by computing a mean value of the data points within a particular interval and by determining a positive and negative stability bound by computing the standard deviation of the data points within the interval and by possibly multiplying the standard deviation by a predefined factor (e.g. in between 1 and 3). It then may be counted how many data points fall outside the stability range for a particular interval, wherein this may be repeated for all intervals within a series of data points, the overall number of data points falling outside the stability range obtained in this way then yielding the third processed variable.

The length of the interval may, for example, be determined by dividing the overall number of data points in the series of data points (i.e. the number of data points available for a predefined number of days, e.g. 90 days) by a predefined number, for example ranging from 1.5 to 18. For example, the length of the interval may be determined by dividing the overall number of data points by 2.

In one embodiment, a series of data points of a fourth variable relating to the burden of atrial arrhythmias parameter is processed to obtain a fourth processed variable by determining a number of data points within an interval which exceed a predefined threshold. It herein may be looked, for example, at the most recent interval, i.e. the interval containing the last data point (i=0), wherein for this interval it is determined how many data points exceed the predefined threshold, yielding the processed variable.

The threshold may, for example, be chosen to be 0%. In this case a data point for which an atrial arrhythmia is present is counted within the interval. The threshold, however, may be chosen larger, for example to lie in a range between 0% and 90%.

The length of the interval may, for example, be determined by dividing the overall number of data points in the series of data points (i.e. the number of data points available for a predefined number of days, e.g. 90 days) by a predefined number, for example ranging from 1 to 30. For example, the length of the interval may be determined by dividing the overall number of data points by 12.

In one embodiment, a series of data points of a fifth variable relating to a heart rate variability parameter is processed to obtain a fifth processed variable by identifying intervals in a series of data points containing monotonically decreasing values, satisfying a condition $s_i \leq s_{i+1} \leq s_{i+2} \leq \ldots \leq s_{i+L-1}$, wherein $s_i \ldots s_{i+L-1}$ are data points in an interval having a length of L data points. Hence, a series of data points, containing, for example, approximately one data point per day (dependent on whether a transmission of data has been successful on a particular day or not), is processed by looking at moving intervals within the series of data points and by determining whether a particular interval contains monotonically decreasing values. The number of intervals within the series of data points may be counted, the overall number of intervals containing monotonically decreasing values yielding the value for the processed variable.

The length of the interval may, for example, be determined by dividing the overall number of data points in the series of data points (i.e. the number of data points available for a predefined number of days, e.g. 90 days) by a predefined number, for example ranging from 2 to 15. For example, the length of the interval may be determined by dividing the overall number of data points by 9.

In one embodiment, a series of data points of a sixth variable relating to a patient activity parameter is processed to obtain a sixth processed variable by computing a slope of data points in an interval. For this, for example a moving averaging filter may be applied to the series of data points first. Then, the slope of, for example, the most recent interval, i.e. the interval containing the most recent data point (i=0), may be determined.

The length of the interval may, for example, be determined by dividing the overall number of data points in the series of data points (i.e. the number of data points available for a predefined number of days, e.g. 90 days) by a predefined number, for example ranging from 1 to 4. For example, the length of the interval may be determined by dividing the overall number of data points by e.g. 3.6.

In yet another embodiment, a series of data points of a seventh variable relating to a thoracic impedance parameter is processed to obtain a seventh processed variable by identifying intervals in a series of data points containing monotonically decreasing values, satisfying a condition $s_i \leq s_{i+1} \leq s_{i+2} \leq \ldots \leq s_{i+L-1}$, wherein $s_i \ldots s_{i+L-1}$ are data points in an interval having a length of L data points. Hence, a series of data points, containing, for example, approximately one data point per day (dependent on whether a transmission of data has been successful on a particular day or not), is processed by looking at moving intervals within the series of data points and by determining whether a particular interval contains monotonically decreasing values. The number of intervals within the series of data points may be counted, the overall number of intervals containing monotonically decreasing values yielding the value for the processed variable.

The length of the interval may, for example, be determined by dividing the overall number of data points in the series of data points (i.e. the number of data points available for a predefined number of days, e.g. 90 days) by a predefined number, for example ranging from 6 to 18. For example, the length of the interval may be determined by dividing the overall number of data points by 9.

In one embodiment, said mathematical model may be a linear combination of the processed variables, such that by means of the linear mathematical model the processed variables are combined by multiplying the processed variables by an associated coefficient and by adding the weighted processed variables to obtain the heart failure prediction index.

In particular, the linear combination equation may be defined as:

$$S(t) = c_0 x_0 + c_1 x_1(t) + c_2 x_2(t) + c_3 x_3(t) + c_4 x_4(t) + c_5 x_5(t) + c_6 x_6(t) + c_7 x_7(t)$$

where $c_j$ indicates a particular coefficient for a variable $x_j$, and t indicates the actual date for which the heart failure prediction index S(t) is obtained.

Within the linear combination model, herein, the different processed variables may be linearly combined. In addition, additional parameters may be taken into account, for example the so-called SHFM score, derived from the Seattle HF Monitor as described in Levy W C, Mozaffarian D, Linker D T, Sutradhar S C, Anker S D, Cropp A B, Anand I, Maggioni A, Burton P, Sullivan M D, Pitt B, Poole-Wilson P A, Mann D L, Packer M, "The Seattle Heart Failure Model: prediction of survival in heart failure", Circulation, 2006; 113(11): 1424-1433). The SHFM score is computed based on a number of baseline variables including demographics, NYHA Class, LVEF, ischemic etiology, systolic pressure, medical therapy, and laboratory blood and urine tests (hemoglobin, lymphocytes, uric acid, cholesterol, and serum sodium). The SHFM score, herein, in one embodiment, is calculated with baseline values, i.e. values before device implantation.

In another aspect, a method for predicting heart failure hospitalization is provided, the method comprising: processing data derived from signals sensed by an implantable medical device, said signals being indicative of cardiac activity, to obtain a heart failure prediction index, processing a multiplicity of variables relating to different cardiac characteristics to obtain a multiplicity of processed variables, and combining said processed variables using a mathematical model to compute said heart failure prediction index.

The advantages and advantageous embodiments described above for the system equally apply also to the method, such that it shall be referred to the above.

Generally, in one aspect, a method is provided. The method comprises evaluating a score based on one or more parameters. The score relates to a prediction of a first post-implant HF hospitalization. The score may be evaluated based on one or more of the following parameters: 24-hour (mean) heart rate, nocturnal heart rate (rest mean heart rate), heart rate variability (HRV), patient activity (or physical exercise), arrhythmic atrial burden (AF burden), frequency of ventricular extrasystoles (ventricular ectopic beat/hour), and thoracic impedance. The parameters can be combined in any combination with each other in order to evaluate the score. In one embodiment, all parameters are combined for evaluating the score.

A baseline parameter (baseline risk score) may be included in the evaluation of the score. The baseline parameter may be based on the Seattle Heart Failure Model (SHFM).

In another aspect, a system is provided. The system comprises an implantable medical device (IMD) and a server device. The server device is configured to evaluate a score based on one or more parameters mentioned above. The score relates to a prediction of a first post-implant HF hospitalization.

The server device may comprise one or more processors and/or memory.

The implantable medical device may be configured to determine one or more (even all) of the parameters mentioned above. The implantable medical device may be configured to transmit measurement values of measured parameters to the server device, e.g. via a patient remote. In one embodiment, the implantable medical device transmits the measurement values wirelessly to the patient remote (e.g. via MICS—medical implant communication service or Bluetooth) and the patient remote transmits the measurement values wirelessly to the server device, e.g. via mobile communication like GSM (GSM—global system for mobile communications), UMTS (UMTS—universal mobile telecommunications system), LTE (LTE—Long Term Evolution) or any other standard for wireless communication or via the internet using WLAN and/or wired network communication. The patient remote may be a smartphone, a tablet or a mobile device dedicated for relaying communication from the implantable medical device to the server device and/or from the server device to the implantable medical device.

The implantable medical device may be a pacemaker, an ICD (ICD—implantable cardioverter-defibrillator), an ICD with cardiac resynchronization therapy (CRT-D), or a loop recorder.

The system may further comprise a clinician device. The server device may be configured to transmit the score to the clinician device, e.g. via mobile communication like GSM (GSM—global system for mobile communications), UMTS (UMTS—universal mobile telecommunications system), LTE (LTE—Long Term Evolution) or any other standard for wireless communication or via the internet using WLAN and/or wired network communication. The clinician device may be a laptop, a tablet or a smartphone, for example.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

An idea underlying the present invention shall subsequently be described in more detail with reference to the embodiments shown in the drawings. Herein:

FIG. 2 shows a graphical representation of a function for processing a first variable relating to the mean ventricular heart rate;

FIG. 3 shows a graphical representation of a second function for processing a second variable relating to the mean number of ventricular extrasystoles per hour;

FIG. 4 shows a graphical representation of a function for processing a third variable relating to the mean ventricular heart rate at rest;

FIG. 5 shows a graphical representation of a function for processing a fourth variable relating to the burden of atrial arrhythmias;

FIG. 6 shows a graphical representation of a function for processing a fifth variable relating to the heart rate variability;

FIG. 7 shows a graphical representation of series of data points relating to different cardiac characteristics, for an example of a patient with a heart failure event;

FIG. 8 shows a graphical representation of series of data points relating to different cardiac characteristics, for an example of a patient with no heart failure event;

FIG. 12 shows a graphical plot of the heart failure prediction index over time, for a case with a primary endpoint and for a case with no primary endpoint.

DETAILED DESCRIPTION

Figure 1:
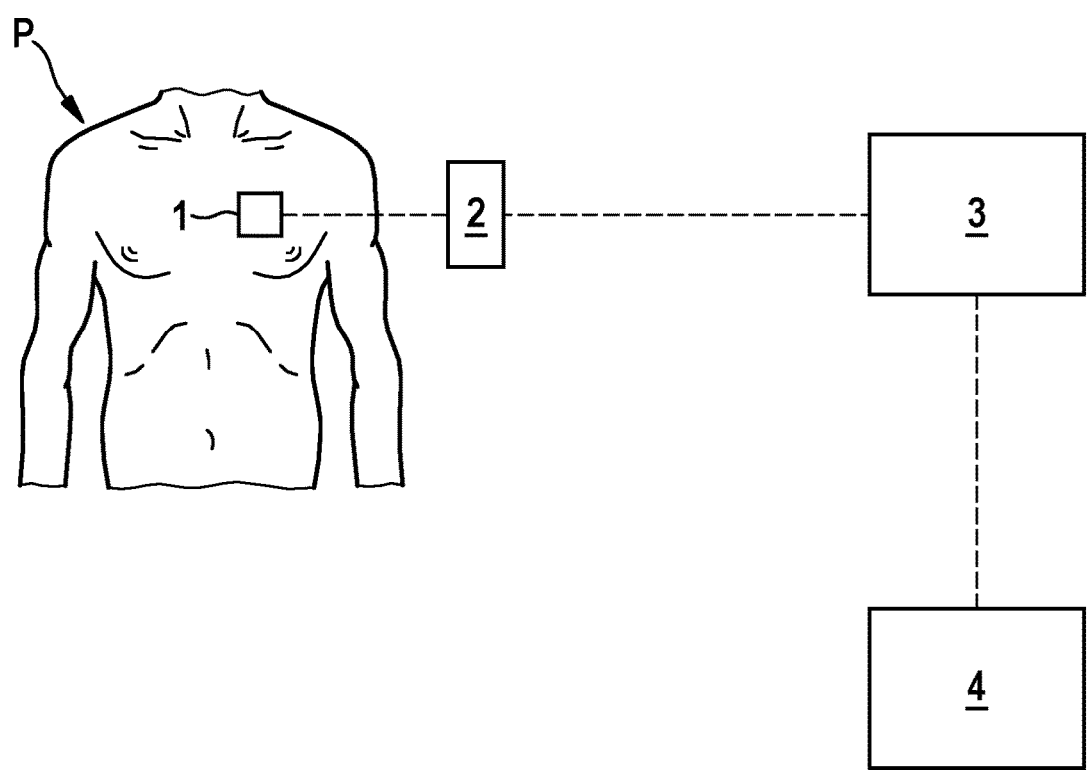
FIG. 1 shows a schematic drawing of a home monitoring system for remotely monitoring a patient's heart condition.

FIG. 1 shows a setup of a home monitoring system allowing for a remote monitoring of a patient P at its home.

The patient P, in the scenario of FIG. 1, carries an implanted medical device 1, for example a cardiac stimulation device, such as a pacemaker device or a defibrillator device, for example an ICD device or a CRT-D device. The implantable medical device 1, in this context, may provide for a therapy function, such as a pacemaker function or a defibrillation function, and at the same time is equipped and configured for sensing data relating to cardiac activity.

The implantable medical device 1 is in operative connection with a patient device 2, which is external to the patient P. The patient device 2 is configured to wirelessly communicate with the implanted medical device 1, using, for example, a conventional wireless communication technology, such as an MICS scheme, a telemetry scheme or another communication protocol such as Bluetooth or the like.

The patient device 2 in particular is configured to receive data from the implanted medical device 1, in particular data relating to cardiac activity and hence data allowing for a monitoring of a cardiac condition of the patient P. In addition, the patient device 2 may be configured to transmit data towards the medical device 1, such as command data or configuration data for configuring operation of the medical device 1.

The patient device 2 is in operative connection with a server device 3, which may be placed at a remote location with respect to the patient's home. Whereas the patient device 2 may be a portable device which is located at the home of the patient P, the server device 3 may be placed at a healthcare provider, for example within a hospital or at a data processing entity separate from a hospital. The patient device 2 and the server device 3 may communicate with each other using a conventional communication technology, such as a mobile technology (UMTS, LTE or the like), or using a public wire-bound telephone and data network or the internet.

The server device 3 may be accessible from a clinician device 4, for example a computing device such as a stationary computer (PC), a laptop computer, a tablet computer or a portable device such as a mobile telephone, and hence by a clinician located, for example, in a healthcare environment, such as within a hospital. Via the clinician device 4 a clinician may in particular monitor and examine data received by the server device 3 from the patient device 2 and via the patient device 2 from the medical device 1 for monitoring a patient's condition.

The server device 3 may constitute a processing device which serves to process data received from the medical device 1.

It shall be noted in this respect that a processing of data is not limited to a server device 3 as shown in FIG. 1, but may also take place immediately within the medical device 1, within the patient device 2, or on a clinician device 4. The processing as described herein hence is not limited to a server device 3 as in the setup of FIG. 1.

The home monitoring of a patient P in particular serves to provide for an indication of a need for hospitalization of the patient P. If it is detected that the cardiac condition of the patient P worsens, the patient P shall be hospitalized, such that the patient P may be treated in order to avoid a heart failure event.

In this respect, there is a general desire to come up with a monitoring score which allows for a clear and easy to understand indication that a heart failure event may likely be imminent, such that it can be decided whether a hospitalization of the patient P is required.

When coming up with such a score, denoted herein as heart failure prediction index, there however is a further desire to be able to determine such score with a high sensitivity (i.e., with a high probability of a alert in case a heart failure event may be imminent) and at the same time with a high specificity (i.e., with a high probability that correctly no alert is raised in case no heart failure event is imminent—in other words: a low false alarm rate). When using a heart failure prediction index of this kind in practice, the usefulness of such an index will largely depend on the sensitivity (because only sensitive methods can provide for a correct alert) and the specificity (because a large false alarm rate must be avoided in order to ensure acceptance of the index).

In this context, a scheme for computing a heart failure prediction index is proposed, the scheme allowing for an improved sensitivity and specificity when determining the heart failure prediction index.

For this, a two-step approach is proposed, wherein in a first step a processing of variables relating to different cardiac characteristics is conducted and in a second step processed variables obtained in the first step are combined in order to come up with a value for the heart failure prediction index.

The processing of the different variables relating to different cardiac characteristics herein is based on a trend analysis, in order to detect certain trends within particular cardiac characteristics which may be indicative of a likely heart failure event. The detection of trends yields processed variables, which may then be combined to come up with an overall score indicating a likelihood that within a certain future time range, for example within the next 90 days, a heart failure event is likely. Based on this, an alert may be triggered, which allows a decision about whether a patient needs to be hospitalized or not.

In one embodiment, the different cardiac characteristics which are evaluated in order to compute the heart failure prediction index include the mean ventricular heart rate (MVHR), the mean number of ventricular extrasystoles per hour (PVC/h), the mean ventricular heart rate at rest (MVHRR), the burden of atrial arrhythmias as cumulative percentage in 24 hours (ABdn), the heart rate variability, namely the PP variability (PPVar), the patient activity (Act) as percentage over 24 hours, and the thoracic impedance (TI).

The mean ventricular heart rate is averaged over 24 hours, wherein, for example, in a series of data points one value for the mean ventricular heart rate may be received from the implanted medical device 1 per date. This parameter hence indicates the mean heart rate averaged over one day.

The mean number of ventricular extrasystoles is determined by counting the extrasystoles per day and by averaging the obtained value over 24 hours. This parameter hence indicates the frequency of extrasystoles per hour.

The mean ventricular heart rate at rest is derived from the ventricular heart rate during night hours, for example between 12 pm and 5 am, hence during hours at which a patient P usually is asleep. The parameter is determined by averaging the heart rate over these rest times.

The burden of atrial arrhythmias is determined as cumulative percentage in 24 hours. An arrhythmia herein is assumed to be present if atrial signals and ventricular signals are arrhythmic, atrial signals being faster than ventricular signals and exceeding a threshold, for example 200 bpm. The parameter is determined by summing the times at which atrial arrhythmias are present and by dividing the cumulative time by 24 hours, such that a percentage value is obtained. The parameter is usually output by the medical device 1.

The heart rate variability is, for example, determined as the PP variability, that is, the variability in atrial PP intervals. The variability is determined as the standard deviation of the PP interval length over one day, wherein periods of atrial fibrillation are excluded.

A patient activity parameter is determined using an accelerometer sensor indicating a movement of the patient. Herein, times at which a patient is active are accumulated and divided by 24 hours, such that a percentage value indicating a patient activity per day is obtained.

A thoracic impedance parameter is measured between an electrode implanted in the patient's heart and the device can. The thoracic impedance provides for a measurement of pulmonary congestion, the thoracic impedance changing, for example, when water is present in the lung.

A series of data points may be considered, for example, during a defined time period, for example 90 days. Herein, it generally can be assumed that the medical device 1 may transmit data relating to cardiac characteristics once or multiple times a day, such that, for example, one data point for each cardiac variable is obtained per day. Hence, if transmission each day is successful, for example 90 data points in a data series relating to 90 days may be present, wherein the number of available data points however may vary depending on whether a transmission from a medical device 1 is successful or not, and whether one or multiple data points are received per day.

For determining the heart failure prediction index on one day, data points during the last 90 days, for example, may be determined, wherein the length of the time period for which data points are considered may vary and may range, for example, from 30 days to 150 days.

For the available data points, variables relating to the above noted cardiac characteristic parameters are processed to obtain processed variables. The processed variables are then combined using a mathematical model, in particular a linear model, in order to determine the overall heart failure prediction index and hence a value for a likelihood that a heart failure event may likely occur in a predefined future time range, for example within the next 90 days.

Referring now to FIG. 2, for processing the mean ventricular heart rate, intervals I L in the overall series of data points s are considered and, within the intervals I, it is determined whether the intervals I contain only monotonically increasing values. For determining the value of the processed variable, the number of intervals I which contain only monotonically increasing data points is determined.

Herein, the overall series s may contain nW data points. Each interval I may contain a subset of these data points nW, the length of the interval I being computed, for example, by dividing the number of data points nW over a defined number, ranging, for example, from 9 to 45, and then taking the integer value of the obtained result. For example, for determining the length of each interval I the number of data points nW may be divided by 30 and the integer value may be taken, such that the length of the interval I is determined as $$L=\text{Int}(nW/30)$$

If nW is 90, L equals 3.

In each interval I it is then examined whether the data points contained in the particular interval I satisfies the following condition:

$$s_i \geq s_{i+1} \geq s_{i+2} \geq \ldots \geq s_{i+L-1}$$

$s_0$ herein represents the latest data point (of today), i represents the data point at remote transmission i, and i+1 represents the data point the transmission prior to transmission i.

If the condition is fulfilled, the particular interval I is counted, the overall count of monotonically increasing intervals yielding the value of the processed variable.

Referring now to FIG. 3, for processing the mean number of ventricular extrasystoles per hour (PVC/h) a series of data points s relating to the mean number of ventricular extrasystoles per hour is first smoothed by applying a moving average filter, the moving average filter having, for example, a lag of length $l_m$ ranging from 4 to 8. After the smoothing, a slope over one interval I is determined, wherein preferably the latest interval I, that is, the interval I containing the latest data point $s_0$, is considered.

Herein, the overall series s may contain nW data points. The interval I may contain a subset of these data points nW, the length of the interval I being computed, for example, by dividing the number of data points nW minus the lag $l_m$ over a defined number, ranging, for example, from 0 to 3, and then taking the integer value of the obtained result. For example, for determining the length of the interval I the number of data points nW minus the lag $l_m$ may be divided by 2 and the integer value may be taken, such that the length of the interval I is determined as $$L=\text{Int}((nW-l_m)/2)$$

If nW is 90 and $l_m$ is 4, L equals 43.

Referring now to FIG. 4, for processing the mean ventricular heart rate at rest a series of data points s relating to the mean ventricular heart rate at rest may be processed by applying a stability range. Herein, for each interval I of the series of data points s, a stability range SR may be determined, the stability range SR being defined by the mean value M of the data points $s_i$ within the interval I and by computing a (positive and negative) stability bound K, which equals the standard deviation of the data points $s_i$ in the interval I multiplied by a factor, for example 1.5. For each interval I it is then determined how many data points fall outside the stability range SR, wherein the outliers determined in this way are summed over all intervals I, yielding the value for the processed variable for the mean ventricular heart rate at rest.

Again, the overall series s may contain nW data points. Each interval I may contain a subset of these data points nW, the length of the interval I being computed, for example, by dividing the number of data points nW over a defined number, ranging, for example, from 1.5 to 18, and then taking the integer value of the obtained result. For example, for determining the length of each interval I the number of data points nW may be divided by 2 and the integer value may be taken, such that the length of the interval I is determined as $$L=\text{Int}(nW/2)$$

If nW is 90, L equals 45.

Referring now to FIG. 5, for processing the burden of arrhythmias the interval I containing the most recent data point as 0 may be determined, and it may be determined how many data points during that interval I exceeds a predefined threshold TH. This function hence returns the number of days with actual burden exceeding the threshold TH in the last L transmissions (L indicating the length of the interval I).

The overall series s of the burden of arrhythmias parameter may contain nW data points, as shown in FIG. 5. The interval I may contain a subset of these data points nW, the length of the interval I being computed, for example, by dividing the number of data points nW by a defined number, ranging, for example, from 1 to 30, and then taking the integer value of the obtained result. For example, for determining the length of the interval I the number of data points nW may be divided by 12 and the integer value may be taken, such that the length of the interval I is determined as $$L=\text{Int}(nW/12)$$

If nW is 90, L equals 7.

Referring now to FIG. 6, for processing the variable relating to the heart rate variability (PPVar) a series of data points s relating to the heart rate variability, as shown in FIG. 6, is first smoothed by applying a moving average filter, having a lag of, for example, 8.

Subsequently, intervals I are identified in which data points are monotonically decreasing, satisfying the condition $$s_i \leq s_{i+1} \leq s_{i+2} \leq \ldots \leq s_{i+L-1},$$

wherein $s_i \ldots s_{i+L-1}$ are data points in an interval I having a length of L data points. If this is true, the particular interval I is counted, the overall count of monotonically decreasing intervals I yielding the value of the processed variable.

The overall series s of the heart rate variability parameter may contain nW data points, as shown in FIG. 6. The interval I may contain a subset of these data points nW, the length of the interval I being computed, for example, by dividing the number of data points nW minus the lag $l_m$ by a defined number, ranging, for example, from 2 to 15, and then taking the integer value of the obtained result. For example, for determining the length of the interval I, the number of data points nW minus the lag $l_m$ may be divided by 9 and the integer value may be taken, such that the length of the interval I is determined as $$L=\text{Int}((nW-l_m)/9)$$

If nW is 90 and $l_m$ is 8, L equals 9.

For processing the activity parameter the slope within an interval of a series of data points relating to the activity parameter may be determined, as shown in FIG. 3. In particular, for processing the activity parameter the interval containing the latest data point, i.e. the latest interval, may be considered, the interval having a length corresponding to the number of data points divided by a number ranging between 1 to 4, for example 3.6.

The value of the processed variable then is equal to the slope of the interval.

For processing the thoracic impedance parameter the function of FIG. 6 may be applied. Namely, in a series of data points relating to the thoracic impedance those intervals may be identified which contain monotonically decreasing data points. Prior to identifying these intervals a smoothing of the series of data points may be conducted by applying a moving averaging filter. The intervals herein may have a length corresponding to the number of data points of the series of data points minus the lag of the moving averaging filter divided by a number ranging from 6 to 18, for example 9.

The value of the processed variable in this case is equal to the number of intervals containing only monotonically decreasing data points.

In addition to the different variables, a so-called SHFM score may be considered and included in the computation of the heart failure prediction index. The SHFM score is derived from the Seattle HF Monitor as described in Levy W C, Mozaffarian D, Linker D T, Sutradhar S C, Anker S D, Cropp A B, Anand I, Maggioni A, Burton P, Sullivan M D, Pitt B, Poole-Wilson P A, Mann D L, Packer M, "The Seattle Heart Failure Model: prediction of survival in heart failure", Circulation, 2006; 113(11): 1424-1433). For computing the SHFM score a number of parameters may be collected at device implantation, the possible number of parameters used for computing the SHFM score being included in the subsequent table. In the table, herein the parameters are listed along with their description and required units. Also the required transformations and respective coefficients are reported for SHFM score calculation. All values refer to time of score calculation:

TABLE 1 parameters for SHFM calculation

| Variable | Description | Unit | Transformation | Coefficient |
|---|---|---|---|---|
| Demographics | | | | |
| Age | — | years | Age/10 | Ln (1.09)* |
| Sex | — | 1 if male; 0 if female | Sex | Ln (1.089) |
| Weight | This variable is needed for Furosemide dose normalization | Kg | — | 0 |
| NYHA | New York Heart Association HF Class | 1: NYHA I; 2: NYHA II; 3: NYHA III; 4: NYHA IV | NYHA | Ln (1.6) |
| LVEF | Left Ventricle Ejection Fraction | % | 100/LVEF | Ln (1.03) |
| CAD | Coronary Artery Disease | 1: Yes; 0: No | CAD | Ln (1.354) |
| SBP | Sistolic Blood Pressure | mmHg | Use SBP/10 if SBP >160 mmHg; otherwise replace SBP = 160 mmHg/10 | Ln (0.877) |
| Medications | | | | |
| ACE-I | Angiotensin-converting enzyme Inhibitors | 1: Yes; 0: No | ACE-I | Ln (0.77) |
| Betablockers | | 1: Yes; 0: No | Betablockers | Ln (0.66) |
| ARB | Angiotensin receptor blocker | 1: Yes; 0: No | ARB | Ln (0.85) |
| K-sparing diuretics | | | K-sparing diuretics | Ln (0.74) |
| Statins | | | Statins | Ln (0.63) |
| Weight adjusted Furosemide dose | | mg/Kg | Furosemide dose/weight | Ln (1.178) |
| Allopurinol | | | Allopurinol | Ln (1.571) |
| Laboratory | | | | |
| Sodium | | mmol/L | 138-Sodium only if Sodium <138 | Ln (1.05) |
| Cholesterol | | mg/dL | 100/Cholesterol | Ln (2.206) |
| Hemoglobin | | g/dL | 16-Hemoglobin if Hemoglobin <16 | Ln (1.124) |
| | | | Hemoglobin-16 if Hemoglobin >16 | Ln (1.336) |
| Lymphocytes | | % | Lymphocytes/5 if Lymphocytes <47%; otherwise replace Lymphocytes by 47%/5 | Ln (0.897) |
| Uric Acid | | mg/dL | Replace Uric Acid = 3.4 if Uric Acid >3.4 | Ln (1.064) |

Ln indicates the natural logarithm.

Conversion of various weight-adjusted diuretic regimens into a uniform daily furosemide equivalent dose can be performed using the following conversion: 80 mg=torsemide 40 mg=bumetidine 3 mg=metolazone 2 mg=hydrochlorothiazide 25 mg.

Having obtained the values for the processed variables as described above and in addition having obtained the value for the SHFM score, a mathematical model can be employed to compute the heart failure prediction index. For this, in one embodiment, a linear mathematical model providing for a linear combination may be employed according to the following equation:

$$S(t) = c_0 x_0 + c_1 x_1(t) + c_2 x_2(t) + c_3 x_3(t) + c_4 x_4(t) + c_5 x_5(t) + c_6 x_6(t) + c_7 x_7(t)$$

S(t) herein indicates the heart failure prediction index at date t, $c_j$ indicate coefficients for the different processed variables $x_j(t)$. Herein, $x_0$ relates to the SHFM score, $x_1$ relates to the mean ventricular heart rate, $x_2$ relates to the mean number of ventricular extrasystoles, $x_3$ relates to the mean ventricular heart rate at rest, $x_4$ relates to the burden of atrial arrhythmias, $x_5$ relates to the heart rate variability (PP variability), $x_6$ relates to the patient activity, and $x_7$ relates to the thoracic impedance.

The values of the coefficients $c_j$ may be determined by numerical optimization using training data sets.

Referring now to FIGS. 7 and 8, justification of the processing of the different variables relating to the cardiac activity is illustrated according to different cardiac characteristics, such as the burden of arrhythmias ("AHRE", first-line in FIGS. 7 and 8), the activity parameter ("Activity", second line in FIGS. 7 and 8), the mean ventricular heart rate ("24 h mean HR", third line in FIGS. 7 and 8) and the thoracic impedance ("TI", fourth line in FIGS. 7 and 8)

for a case in which a heart failure event occurred (FIG. 7) and a comparison case in which no heart failure event occurred (FIG. 8). As visible from FIG. 7 in comparison to FIG. 8, the burden of arrhythmias is seen to increase towards the time of a heart failure event (window W1), the activity parameter is seen to decrease (window W2), the mean ventricular heart rate is seen to slowly increase (window W3), and the thoracic impedance is seen to decrease (window W4) in case of a heart failure event. Hence, according to a trend analysis as applied by the functions described before and hence by observing e.g. an increase or decrease over time of certain conduct characteristics a likelihood of a heart failure event may be determined, which may be expressed as a single score number, namely the heart failure prediction index.

In summary, the algorithm processes numerically temporal trends of home monitoring variables of the last W days. W may be selected between 30 and 180 days, depending on considerations about false alert rate and plausibility of connection between an alert and the predicted event. Short Ws will reduce probability of a false alert, but it may reduce sensitivity as well. Vice versa, long Ws may increase sensitivity, but also the false alert rate, while connection between an alert and the subsequent HF event may be less plausible. A reasonable selection for W is 90 days.

In principle, an updated index value may be calculated with every new home monitoring transmission. Therefore a new value is expected to be calculated on average every day.

In case of gaps in home monitoring transmissions, the index can still be calculated at the first home monitoring transmission after a gap using available data within the last W days. Index reliability decreases with longer gaps.

In case of multiple transmissions within the same day, index calculation may be repeated for each transmission. For alerting purposes, any of them may be used.

The HF prediction algorithm requires a minimum of home monitoring transmissions, for example at least nine transmissions, and at least one valid numeric value from all seven variables within the last W days. If any of these two conditions are violated the index value may be classified as invalid, regardless of whether or not a value is actually returned. If all variables yield at least one valid numeric value and there are more than the required minimum of home monitoring transmissions in the last W days, the index value is classified valid.

The HF prediction algorithm may tolerate gaps in home monitoring transmissions. However the predicting performances may be affected by the percentage of monitored days (days with successful home monitoring transmissions). The higher the percentage, the more reliable the index values may be, and the more accurate the prediction may be. The minimum percentage of days with home monitoring transmissions within the last W days for which index values are considered reliable is called 'Minimum Monitoring Rate' (MMR). During the first W days of home monitoring activation, the MMR may be calculated as the percentage of monitored days between the current date and the first date after the Run-in period.

If the HF prediction algorithm returns a valid index value equal to or higher than a nominal threshold, and it is associated with a monitoring rate≥MMR, the index is in an 'Active state', with potentially increased risk of worsening HF.

An automatic alert may, for example, be generated when the index value switches from an inactive state (valid index value<nominal threshold or monitoring rate<MMR) to an active state (valid index value≥nominal threshold and monitoring rate≥MMR) for a predefined number of consecutive days. Statistical analysis performed showed that optimal predicting power is obtained by selecting the nominal threshold to be 3.5, 4.0, or 4.5, and MMR to be 55% or 75%.

Programmability of these parameters (even with larger ranges) may be considered.

After an alert, subsequent active states potentially cannot be used to generate further alerts in the following days, until the index spontaneously switches to an inactive state by falling below the nominal threshold. At the first index value below threshold, alerting function is rearmed, and the index can be used for new HF episodes.

The HF prediction algorithm may require a run-in period for stabilization after home monitoring activation, before it can be used for HF alerting. The run-in period may be selected in a range from 20 to 90 days.

The HF prediction algorithm can be used, for example, in DX-, dual-chamber ICD and CRT-D devices with home monitoring provided with a diagnostic function required for index components. In case of a missing component (for example, TI), the index can still be calculated but there may be data related to prediction performance.

The method as proposed herein has been verified in a study, results of which shall be described subsequently according to FIGS. 9A, 9B to 13.

As an outset of the instant method and system, it has been found that prediction accuracy may improve if baseline information of individual patients is used to efficiently adjust device-based longitudinal predictors. It therefore has been tried to develop and validate an algorithm combining temporal trends of longitudinal HF-related parameters daily collected with a remote monitoring (RM) system, with a previously validated baseline risk score. Here the results of derivation and validation analyses of the algorithm and its performance in predicting the first post-implant HF hospitalization are reported.

For the study, data of a multi-center, prospective, event-driven study with the aim of correlating first post-implant HF-related hospitalizations with RM temporal trends from implanted devices have been analyzed. The study included patients with standard indications to dual-chamber ICDs or defibrillators with the CRT option (CRT-D devices), showing a left ventricular ejection fraction (LVEF)≤35%, and a New York Heart Association (NYHA) class II or III at the time of implant. Patients were not eligible if they had permanent atrial fibrillation (AF), brain damage from pre-existing cerebral disease, acute decompensated HF, planned cardiac surgery, less than 6-month life expectancy including terminal illness, insufficient mobile phone service coverage at home.

All patients were followed up with biannual in-hospital visits until the study reached the targeted number of adjudicated primary endpoints.

The study was approved by the Ethics Committees in the 34 Italian and Spanish investigational sites. The study was conducted in compliance with the Declaration of Helsinki and the ISO14155:2011 Good Clinical Practice for medical device investigations. Patients had to sign written informed consent before study participation. Study data monitoring plan included 100% source data verification with on-site monitoring visits performed by a contract research organization.

All devices were provided with a home monitoring technology with daily transmissions based on the global system for mobile (e.g. GSM) communication. On a daily basis, long-range telemetry connects the implanted device to a mobile patient unit for transmissions of diagnostics data to a central server through the mobile network. In normal conditions, device data are available through the home monitoring service center that hospital staff can access with credentials.

For study purpose, participating subjects were registered in a restricted area that study team members could not access during the study. The restriction was necessary to ensure that whatever HF-related medical decision was taken, it was not based on RM temporal trends. Only a limited number of automatic alerts including low battery level, disabled detection of ventricular tachycardias, out-of-range pacing and shock impedances, ineffective maximum energy shocks, and AF burden>75% of 24 hours, were activated for safety reasons. Alerts for these specific conditions were automatically notified to the investigators. Notifications only included information relative to the individual out-of-range parameter(s). RM temporal trends remained not accessible to investigators throughout the study.

Data analysis was designed to combine temporal trends of RM-parameters, with a baseline risk-stratifier. We used the Seattle HF Monitor (SHFM, described in: Levy W C, Mozaffarian D, Linker D T, Sutradhar S C, Anker S D, Cropp A B, Anand I, Maggioni A, Burton P, Sullivan M D, Pitt B, Poole-Wilson P A, Mann D L, Packer M. The Seattle Heart Failure Model: prediction of survival in heart failure. Circulation, 2006; 113(11): 1424-1433) based on a number of baseline variables including demographics, NYHA Class, LVEF, ischemic etiology, systolic pressure, medical therapy, and laboratory blood and urine tests (hemoglobin, lymphocytes, uric acid, cholesterol, and serum sodium). SHFM scores were calculated with baseline values, before device implantation.

The primary endpoint of the analysis was the first adjudicated post-implant hospitalization for worsening HF, defined as a non-elective hospital admission with at least one overnight stay, triggered by symptoms or instrumental evidence of worsening HF, and requiring administration or augmentation of intravenous or oral medical therapy for HF, as assessed during the adjudication process.

Secondary study endpoint was a composite of any hospitalization for worsening HF (including both first and subsequent admissions), outpatient intravenous intervention (IVI) for worsening HF and death for worsening HF.

Study endpoints were independently adjudicated by a three-member board according to guidelines provided with a pre-defined charter drawn up by the study Steering Committee. The board consisted of two adjudicating members and a chairman resolving conflicting votes. Adjudication was based on review of pseudonomyzed official medical records and data reported in the electronic case report forms after monitor source data verification. Adjudicators were blinded to the home monitoring trends.

According to the adjudication charter, a worsening HF hospitalization could be confirmed if there was evidence of intravenous administration of diuretics, vasodilators or inotropic agents. In case of oral therapy, this should include ≥40 mg/day increase of furosemide or equivalent and/or thiazide or potassium-sparing diuretics.

The study was an event-driven study designed to collect first post-implant HF-related hospitalizations for the development of a predicting algorithm. The clinical investigational plan required study stop after adjudication of 50 primary endpoints, with a minimum 3 month follow-up of the last enrolled patient. During the interval from occurrence to adjudication of the fiftieth potential primary endpoint, further worsening HF hospitalizations occurred which underwent the adjudication process and were eventually included in the analysis. Before data analysis, study population was a-posteriori randomized to a derivation and a validation group. The randomization was stratified by usable primary endpoint events and device type, in order to obtain two independent cohorts with approximately 460 patients, 30 primary endpoints, and the same distribution of ICD and CRT-D devices. It was estimated that, with 30 primary endpoints in the validation cohort, an assumed sensitivity of 70% could be rated with a 95% confidence interval (CI) of 51% to 85%, having >90% power of rejecting the null hypothesis of a sensitivity≤40% at a one-sided binomial test with $\alpha$=0.025; whereas an assumed 1.0 false-alert alert per patient-year could be estimated with a CI from 0.95 to 1.5 (using the chi-squared distribution).

The predicting algorithm was developed with the primary endpoint events occurred in the derivation cohort. Some technical details of derivation procedures were provided in a previous publication, namely Padeletti L, Botto G L, Curnis A, De Ruvo E, D'Onofrio A, Gronda E, Ricci R P, Vado A, Zanotto G, Zecchin M, Antoniou X, Gargaro A. Selection of potential predictors of worsening heart failure: rational and design of the study. J Cardiovasc Med (Hagerstown), 2015; 16(11):782-789. Briefly, temporal trends of each RM variable were first separately analyzed by univariate logistic models. Optimal intervals for numerical processing were independently identified for each single RM variable by maximizing the associated statistics. Subsequently, significant variables were selected by an automatic backward stepwise procedure (p to remove>0.10) applied to multivariable models to remove redundant variables. The SHFM was included as an adjusting covariate.

Model coefficients were used to construct the predicting algorithm (HF prediction index). Results of logistic analyses were reported in terms of odds ratio (OR) with CI. Projected sensitivity and specificity were estimated by the Receiver Operating Characteristic (ROC) curve analysis, reporting the area under the curve (AUC) along with its CI. Index nominal thresholds maximizing projected prediction accuracy were identified and subsequently tested in the validation phase of the analysis.

The HF prediction index was tested in the validation cohort. Daily index values were calculated. A maximum prediction period of 90 days was set to discriminate predicted events (true-positive), failed predictions (false-negative) and false alerts (false-positive). An alert for a possible endpoint event was defined when valid index values exceeded a nominal threshold for 5 consecutive days. From that point in time endpoint events were searched for the subsequent 90 days (prediction period). As a dynamic index, its value needed to 'spontaneously' fall below the nominal threshold in order to be rearmed for subsequent alerts. In case of inappropriate alerts, index values above the nominal threshold were defined as inappropriate active states of the algorithm.

Figure 9A:
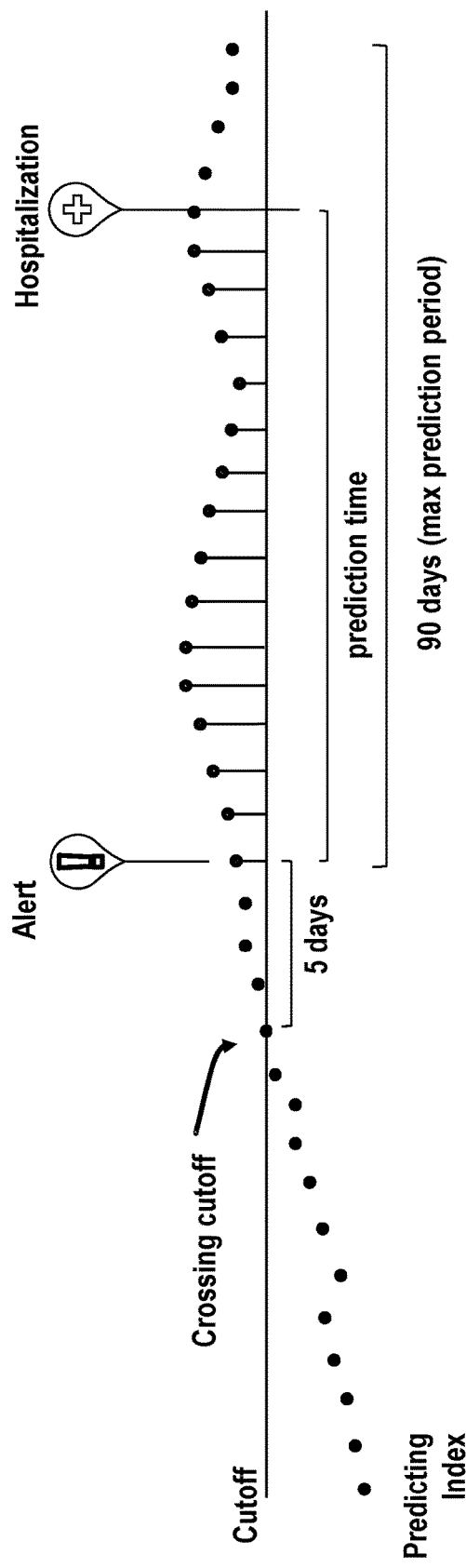
FIG. 9A shows a graphical plot of a heart failure prediction index (also denoted as HF predicting index) over time.
Figure 9B:
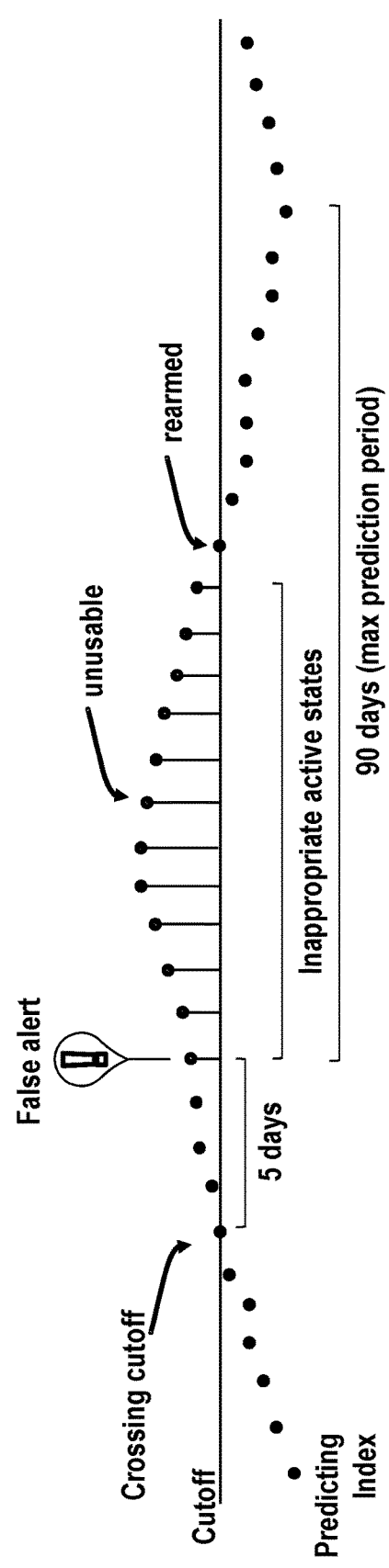
FIG. 9B shows a graphical plot of a heart failure prediction index (also denoted as HF predicting index) over time, in another example.

FIGS. 9A and 9B show sensitivity and false alert rate calculation during validation analysis. Scheme of the methods for sensitivity (FIG. 9A) and false-alert rate (FIG. 9B) calculation: prediction success was defined as any alert (5 consecutive days with the HF prediction index values above nominal threshold) followed by an endpoint event within a maximum prediction time of 90 days. Prediction time was the interval from alert to event; a false alert was defined as any alert not followed by an endpoint event within 90 days. Subsequent days with index values above nominal thresholds were defined as inappropriate active state and were not usable for patient monitoring Sensitivity, false-alert rate and absolute specificity were calculated for both primary and secondary endpoints. Sensitivity was defined as the percentage of events with an alert within the preceding 90 days. A false alert was defined as an alert without an adjudicated study endpoint in the subsequent 90 days. The false alert rate was reported as the number of false alerts per patient-years. Finally, the absolute specificity was calculated as the percentage of days without inappropriate active states of the algorithm. Only valid index values were included in the analysis, i.e. values for which all components of the HF prediction algorithm were available at least in one of the preceding 90 days, and overall RM transmission success rate was ≥55%. The first 90 days post-implant were used for algorithm initiation, whereas 30-days intervals before and after any reported adverse event (not related to HF) were excluded from the analysis.

Continuous variables were reported with median (interquartile range), binary or categorical variable as counts and percentages of non-missing data. Comparisons between study groups were performed with the Mann-Whitney U test for continuous variables, Pearson's chi-squared or Fisher's exact test, as appropriate, for binary variables. All tests were significant with p≤0.05. Statistical analyses were performed with STATA 11SE software version (StataCorp LP, Texas, USA).

Figure 10:
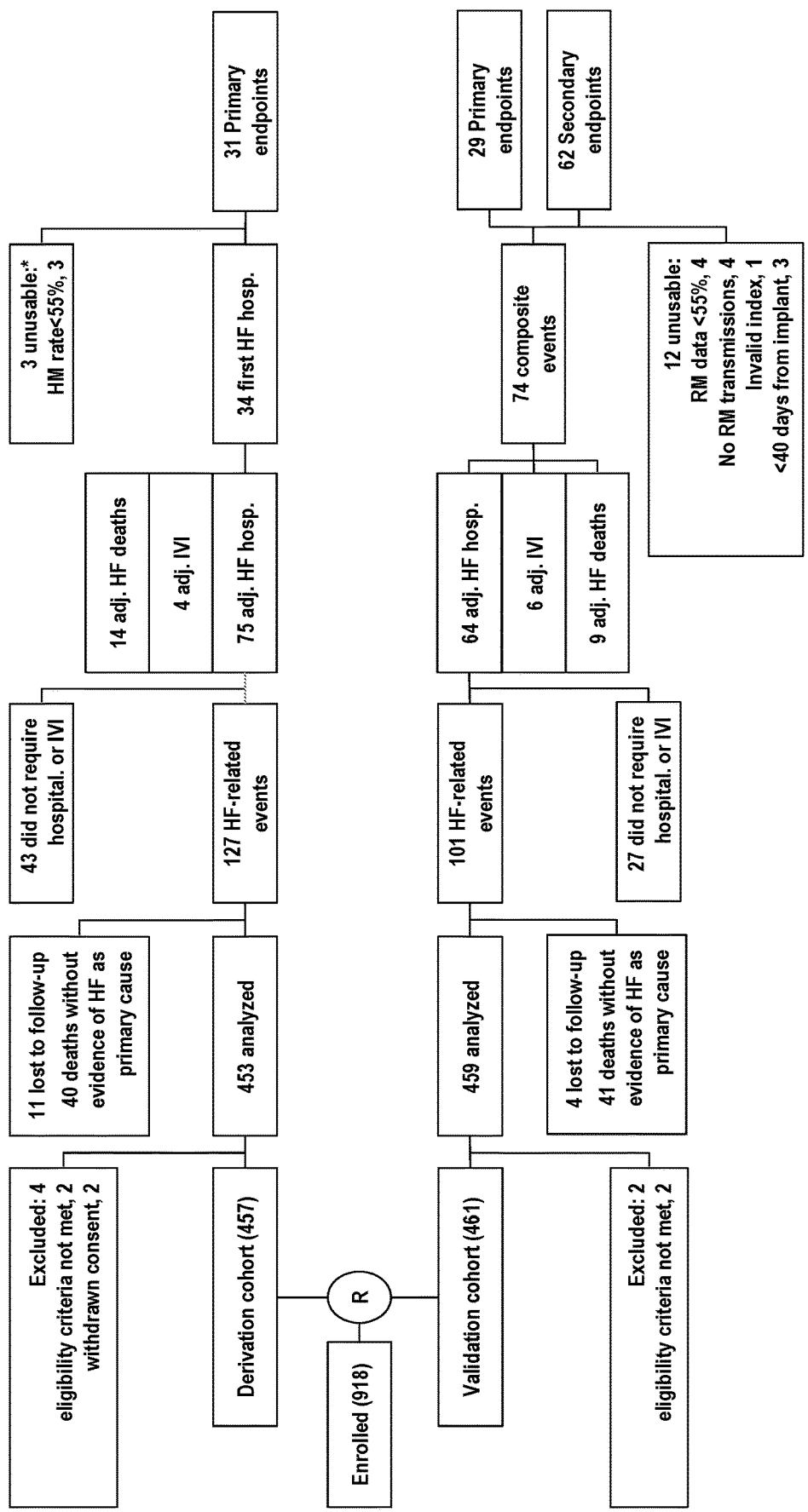
FIG. 10 shows a diagram of a conducted study.
Figure 11:
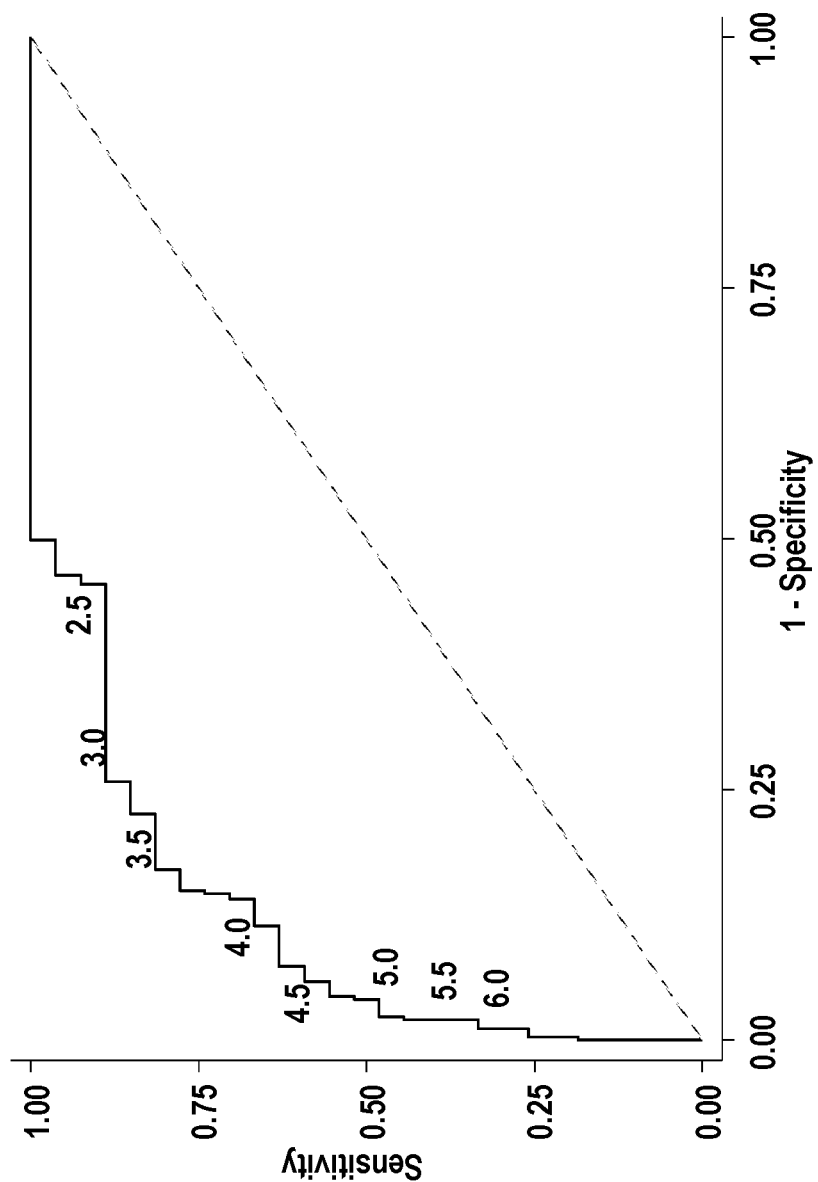
FIG. 11 shows a sensitivity versus specificity plot for different alert threshold values.

The study recruited 918 patients with a dual-chamber ICD (56%) or CRT-D devices (44%). Study population could then be randomized in the derivation (n=457) and validation (n=461) cohorts, before data analysis. Patient characteristics are reported in Table 2. No significant differences were observed between study cohorts in main baseline variables. As shown in FIG. 10, during data analysis, 4 patients in the derivation cohort were excluded for unmet eligibility criteria (2) and for consent withdrawal (2). Also 11 patients were lost to follow-up and 40 died during follow-up with no evidence of HF as primary cause. For these patients, data up to last available information were included. In FIG. 10, the following abbreviations are used: EP—endpoint; HF—Heart Failure; IVI—outpatient intravenous interventions; R—a-posteriori randomization stratified by primary endpoint and device type; RM—Remote Monitoring.

In the validation cohort, 2 patients had to be excluded for unmet eligibility criteria. Further 4 patients were lost to follow-up and 41 died without documentation of worsening HF as primary cause. Data were used up to date of last available information.

In the derivation cohort, 127 HF-related adverse events were reported with a rate of 0.14 events per patient-years: 75 were adjudicated as HF hospitalizations (9 of which were terminal), 14 deaths with HF as primary cause, 4 outpatients visits with IVI, 43 did not required hospitalizations or IVIs. Of the 75 HF-hospitalizations, 34 were first post-implant hospital admissions. Of this group, 3 did not meet usability criteria. Finally, 31 primary endpoint events could be used for derivation of the predicting algorithm.

In the validation cohort, there were 101 HF-related adverse events, 27 of which did not require hospitalization or IVI. Of the remainders, 64 were HF-hospitalizations (5 were terminal), 9 deaths for worsening HF, 6 IVIs. Of the 38 worsening HF hospitalizations reported as first post-implant admissions, 8 had to be excluded for the usability criteria. The composite of any (first or subsequent) worsening HF hospitalizations, deaths, or IVIs were 74 events, 12 of which could not be used for usability criteria (4), inability to activate RM transmissions (4), invalid values of the predicting algorithm (1), occurrence within 40 days post-implant (Run-in period). Eventually there were 29 primary and 62 secondary endpoint events that could be used for algorithm validation tests.

The algorithm was derived with the 31 primary endpoints of the derivation cohort. Table 3 shows the results of the development analyses, reporting the list of the variables included in the algorithm, along with the optimized time interval for numerical processing. All RM variables were statistically significant at the univariate analysis, whereas the corresponding multivariable model constituted the HF prediction index, whose unitary increase was associated with an OR of 2.73 (CI, 1.98-3.78, p<0.001) for first post-implant HF admission. At the ROC analysis (FIG. 11—ROC curve showing the results sensitivity versus false positive rate (1-specificity) of the HF prediction algorithm during derivation analysis), the index showed an AUC of 0.89 (CI, 0.83-0.95). The index values potentially representing nominal cutoffs with highest prediction accuracy ranged between 3.5 and 4.5: at 4.0, the projected sensitivity, specificity and total accuracy were 70.4%, 85.9%, 84.8%, respectively.

The results of the validation tests performed with the primary and secondary endpoints in the validation cohort are reported in Table 4. Different sensitivity and false-positive rate level could be obtained by varying the index cutoffs between 3.5 and 4.5. At a nominal cutoff of 4.5, 22 of the 29 primary endpoints could be predicted within the preset prediction time of 90 days, corresponding to a sensitivity of 75.9% (CI, 56.5%-89.7%) The median prediction time was 66 days (interquartile range, 20-80 days). The associated false-alert rate was 0.90 alerts per patient-year. The cumulative percentage of days free from inappropriate active states of the HF prediction algorithm (absolute specificity) was 93.5%.

For the combined secondary endpoint of any HF-related death, hospitalization, or IVI, a nominal index cutoff of 4.5 was associated with a sensitivity of 74.2% (CI, 61.5%-84.5%), a median prediction time of 66 days (interquartile range, 20-84 days), a rate of 0.95 false-alerts per patient-year, an absolute specificity of 93.0%.

As an example, FIG. 12 shows the mean temporal trends of the HF predicting index averaged over the group of patients with (solid line, n=60) and without (dashed line, n=858) primary endpoint events, during 180 days aligned by the date of the event or the last RM transmission, respectively. A progressive increase of the index average is visible in the last 20 days before the event. Also the radar graph shows the relative weights of each component 180, 90, and 1 days before the event, with the curve areas proportional to the average values of the index. Further FIG. 12 shows temporal trends of the HF predicting index. The average daily values of the HF predicting index are plotted in patients with (N=60, solid line) and without (N=858, dashed line) primary endpoint events. Data are aligned relative to the date of HF hospitalization (primary endpoint group) and the last available RM transmission date (no primary endpoint group). The radar plot below shows the average relative weights of the algorithm components and their evolution from 180 days (dot line), 90 days (dash line), and 1 day (solid line) before the first post-implant worsening HF hospitalization. Areas enclosed in the curves are proportional to the index values (AF—atrial fibrillation; HF—Heart Failure; HR—heart rate; HRV—heart rate variability; PVC—premature ventricular complexes; SHFM—Seattle Heart Failure Monitor; TI—thoracic impedance).

We developed an algorithm for worsening HF prediction in ICD and CRT-D patients based on the baseline SHFM score and seven RM temporal trends numerically processed in different timeframes: (i, ii) increasing 24-hour and nocturnal mean heart rate; decreasing (iii) Heart Rate Variability (HRV) and (iv) physical activity; (v) daily AF burden; (vi) number of ventricular extrasystoles in 24 hours; (vii) decreasing thoracic impedance, corresponding to increase in pulmonary fluid levels. Association of each single variable with HF is well known, but their ability to risk-stratify is not sufficient, when individually taken. The HF prediction algorithm is a way of efficiently combining these variables when daily sampled through the home monitoring system. Using a nominal threshold of 4.5, the HF prediction algorithm has been shown to predict 76% of first post-implant HF hospitalizations with median 66-day advance and a per-patient false-alert rate of approximately one false-alert every 13 months.

Selecting the first post-implant HF hospitalization for developing the algorithm allowed addressing the technical requirement of processing independent study endpoints without any assumptions about reciprocal correlation. The superior performance of the algorithm may somehow relate to this. Additionally first hospitalizations for worsening HF have clinical relevance. Despite improvements in treatments for chronic HF, current therapies for acute HF cannot restore initial patient's conditions and stem disease progression. About one out four patients hospitalized for acute HF are re-admitted for exacerbating HF by the subsequent 12 months and have 31% increased risk of 1-year all-cause mortality, according to a large European survey. Long-term mortality risk increases with multiple hospitalizations. Early diagnosis is important in acute HF as confirmed by the latest recommendations on HF and preventing first acute events is strategic in disease contrasting. Onset of HF symptoms is only a last stage of a decompensation process starting weeks before. Detecting signs of HF before symptoms is therefore crucial for early detection and prevention of acute HF. In this perspective the HF prediction algorithm has been shown to provide a median alert time of 66 days, allowing sufficient time for patient contact, investigations, and preventive measures, if necessary. It is worth noting that the estimation of the median alerting time has been obtained within the constraint of 90 days, assuming implausible any connection with acute HF events occurring more than 90 days after the alert. The maximum prediction time is important for correctly evaluating the accuracy of a predictor: releasing the constraint would have the effect of overestimating sensitivity and prolonging the median alerting time.

The HF prediction algorithm showed good prediction performances also when tested with the composite secondary endpoints of death, hospitalization and outpatient IVI for worsening HF. With a nominal index threshold of 4.5, sensitivity was 74%, the prediction time was 66 days, and false-alert rate was 0.95 alerts per patient-year, showing that the algorithm may be used to also predict subsequent severe HF-related events, including deaths. Of course sensitivity and specificity are inversely related. The estimates are relative to some proposed nominal thresholds. Sensitivity may be increased at the expense of more frequent false-alerts by lowering the nominal threshold, and vice versa. An example is provided in Table 4 where algorithm performances are reported for three nominal thresholds. The selection may really depend on specific clinical and organizational needs.

Several algorithms have been proposed already to combine multiple sensors in an attempt of maximizing prediction performance. The first study was the PARTNERS HF (Program to Access and Review Trending Information and Evaluate Correlation to Symptoms in Patients with Heart Failure) study using an algorithm based on rolling evaluations of pairs of consecutive 30-day intervals. Authors found that the presence of ≥2 triggers or very high level of the pulmonary fluid index in a month was associated to 4.8-fold higher risk of hospitalization in the subsequent 30 days. The heuristic method used in the PARTNERS HF study for combining multiple diagnostic variables was subsequently refined using a Bayesian approach and generating a single-risk score identifying low-, medium-, high-risk values for monthly evaluations. Associated sensitivity/specificity ranged from 83%/46% for low-medium risk, to 46%/90% for medium-high risk, respectively, but 44% evaluations were classified as medium-risk. The fixed window of 30 days for evaluation represent an important difference with the HF prediction algorithm which was based on the combination of several parameters numerically processed within individually optimized timeframes. This is important as decompensating HF may manifest with variations of related parameters with different timing. For example, in our analysis, the optimal timeframe for evaluation of mean heart rate, thoracic impedance, and heart rate variability was 90 days before the hospitalization, while only 7 days for AF, likely related to a more rapid effect in the decompensation cascade.

The MultiSENSE (Multisensor Chronic Evaluation in Ambulatory Heart Failure Patients) study reported that the HeartLogic algorithm, as a daily updated dynamic index, was able to predict 70% of impeding HF-hospitalizations and IVI with a median detection time of 34 days and 1.47 unexplained alerts per patient-years. The HeartLogic is a multisensor algorithm combining several parameters, including analysis of first and third cardiac tones, and respiration rate. Such parameters have profound clinical root but are based on proprietary technology. In contrast the inputs of the HF prediction algorithm are temporal trends of parameters that are part of ordinary diagnostic equipment of almost all implantable devices. In this regard the HF prediction algorithm may have larger generalizability and showed that superior prediction accuracy may be achieved by appropriately exploiting information already available in most devices. Additionally, the daily transmissions which characterize the particular RM system used in the study would allow a centralized implementation of the algorithm without the need of firmware modification or upgrade of implanted devices. This may represent a potential advantage for broad and immediate applicability. Finally, unlike other multivariable predictors, the HF prediction algorithm has been developed and validated in patient cohorts with both dual-chamber ICD and CRT-D devices in similar proportions, which may contribute further to more general application.

Multisensor algorithms proposed so far were essentially based on longitudinal data from device diagnostics. Including information relative to individual patient risk stratification may be important. It has been recently reported that using the HeartLogic algorithm in conjunction with N-terminal pro-B-type natriuretic peptide (NT-proBNP) levels dramatically increased risk-stratification ability, but it would imply serially assessing biomarker levels, which may raise some practical concerns. We incorporated the baseline SHFM score value in the HF prediction model as patient risk-stratifier, which is based on common demographic, etiology, therapy, and blood/urine data normally available at device implantation. The SHFM contributed with 11% relative to the other components, to the numerical value of the HF prediction index before HF-hospitalization. Therefore its contribution was not negligible and comparable to HRV and thoracic impedance, and higher than ventricular extrasystoles, patient activity and AF, with the numerical processing used for algorithm development. As a cross-sectional variable calculated at baseline, the SHFM served as an additive constant in the HF prediction model, shifting the index temporal trend vertically, closer to or away from the nominal threshold, depending on patient risk profile. Incidentally, on average nearly 50% of the numerical value of the index 20 days before hospitalization depended on the 24-hour and nocturnal heart rates. The observation reinforces the importance of these two variables in HF monitoring.

We developed and validated a longitudinal worsening HF predictor combining home monitoring temporal trends of 24-hour and nocturnal heart rate, HRV, patient activity, AF burden, frequency of ventricular extrasystoles, thoracic impedance, with the SHFM as baseline risk-stratifier. The HF prediction algorithm showed superior sensitivity with nearly 2-month warning and remarkably low false-alert rate at the nominal threshold. Further HF-related events including IVIs, subsequent, and terminal hospitalizations could be predicted with similar accuracy. Randomized trials are needed to assess whether the application of the HF prediction algorithm is associated to improved outcomes.

Figure 13:
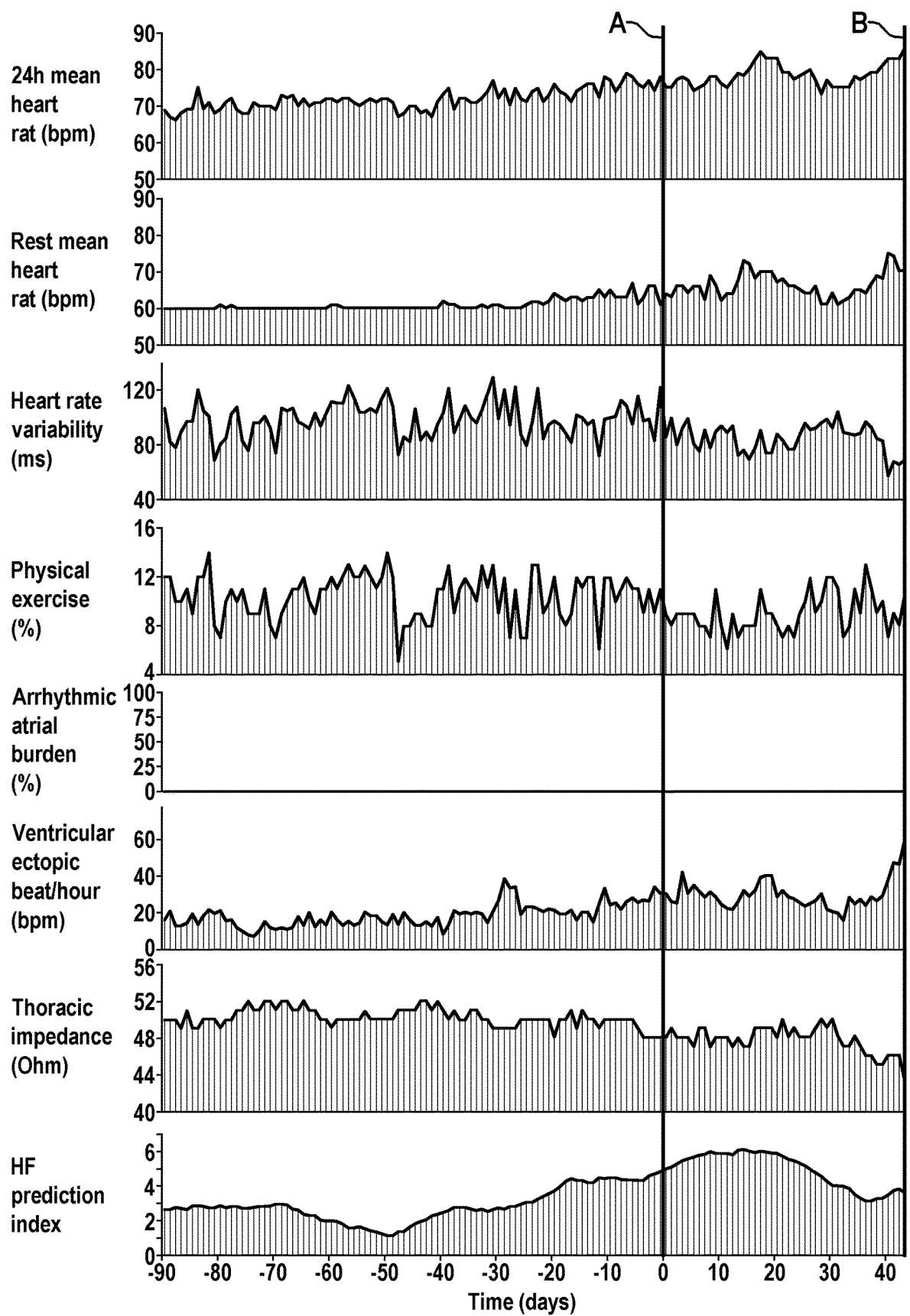
FIG. 13 shows plots of different cardiac variables.

FIG. 13 shows an example of HF hospitalization detected by the HF prediction score in an 82 years old man implanted with a CRT-D, SHFM=0.23. The HF alert occurred 42 days before the hospitalization. Line A: day of HF alert; line B: day of HF hospitalization.

In summary, the HF study enrolled patients with indication to dual-chamber implantable defibrillator (ICD) or ICD with cardiac resynchronization therapy (CRT-D) equipped with a RM characterized by daily transmissions. The primary endpoints of first post-implant HF-hospitalization were independently adjudicated. Investigators and the adjudication committee were blinded to RM. The cohort was a posteriori 1:1 randomized in derivation and validation groups. There were 918 enrolled patients (81% male, median age 69, interquartile interval: 61-76, 44% CRT-D): 457 patients and 31 primary endpoints were assigned to the derivation group; 461 with 29 endpoints to the validation group. Diurnal and nocturnal heart rates, ventricular extrasystoles, atrial burden, heart rate variability, physical activity, thoracic impedance, and a baseline risk-stratifier were combined in one index—denoted herein as HF prediction index—showing a C-statistics of 0.89 (CI, 0.83-0.95) and an Odds Ratio of HF-hospitalization of 2.73 (CI, 1.98-3.78, $p<0.001$) versus unitary index increase. During validation tests, first HF-hospitalizations could be predicted with a sensitivity of 75.9% (CI, 56.5%-89.7%), a median alerting time of 66 days (20-80), false-alert rate of 0.90 (CI, 0.85-0.97) patient-year, and 93.5% false-alert-free days. RM temporal trends and the baseline SHFM can be combined to timely predict the first post-HF hospitalizations, with less than 1 per-patient false-alert per year.

TABLE 2

Patient population by derivation and validation cohorts

| Variable | All | Derivation cohort | Validation cohort | P |
|---|---|---|---|---|
| N | 918 | 457 | 461 | |
| Follow-up (months) | 22.5 (14.1-35.8) | 21.9 (13.8-33.6) | 23.4 (14.6-37.1) | |
| Age (years) | 69.1 (60.7-75.9) | 68.8 (60.7-75.7) | 69.3 (60.8-76.1) | 0.61 |
| Gender (male) | 744 (81.0%) | 366 (80.1%) | 378 (82.0%) | 0.46 |
| BMI (Kg/m$^2$) | 26.7 (24.2-29.4) | 27.0 (24.5-29.4) | 26.5 (24.2-29.4) | 0.33 |
| CRT-D devices | 403 (43.9%) | 202 (44.2%) | 201 (43.6%) | 0.85 |
| QRS duration (ms) | 120 (102-150) | 121 (103-150) | 120 (102-150) | 0.69 |
| LVEF (%) | 30 (25-34) | 30 (25-34) | 30 (25-35) | 0.25 |
| Systolic BP (mmHg) | 120 (110-130) | 120 (110-130) | 120 (110-130) | 0.13 |
| NYHA Class II/III | 446 (48.8%)/ 467 (51.2%) | 225 (49.4%)/ 230 (50.6%) | 221 (48.2%)/ 237 (51.8%) | 0.72 |
| SHFM-predicted 1 y mortality (%) | 4.2 (2.5-7.3) | 4.0 (2.5-7.2) | 4.4 (2.6-7.4) | 0.23 |
| Primary etiology | | | | |
| Ischemic cardiomyopathy | 413 (45.0%) | 206 (45.1%) | 207 (44.9%) | 0.95 |
| Dilated cardiomyopathy | 365 (39.8%) | 185 (40.5%) | 180 (39.1%) | 0.66 |
| Comorbidities | | | | |
| History of hypertension | 604 (65.8%) | 295 (64.6%) | 309 (67.0%) | 0.43 |
| Diabetes | 323 (35.4%) | 153 (33.6%) | 170 (37.2%) | 0.26 |
| Chronic kidney disease | 194 (21.1%) | 107 (23.4%) | 87 (18.9%) | 0.09 |
| AF history | 129 (14.1%) | 68 (15.0%) | 61 (13.3%) | 0.46 |
| Stroke/TIA | 69 (7.5%) | 33 (7.2%) | 36 (7.8%) | 0.73 |
| Valvular surgery | 68 (7.4%) | 37 (8.1%) | 31 (6.7%) | 0.45 |
| Blood, urine tests | | | | |
| Sodium (mg/dL) | 140 (138-142) | 140 (138-142) | 140 (138-142) | 0.38 |
| BUN (mg/dL) | 35.0 (22.4-52.0) | 36.9 (23.0-52.0) | 34.0 (22.4-50.5) | 0.51 |
| Hemoglobin (g/dL) | 13.4 (12.2-14.6) | 13.5 (12.3-14.7) | 13.3 (12.1-14.5) | 0.06 |
| Lymphocites (%) | 25.5 (19.8-31.8) | 25.6 (19.8-31.8) | 25.3 (19.8-31.9) | 0.98 |
| Uric Acid (mg/dL) | 6.1 (4.8-7.6) | 6.0 (4.8-7.7) | 6.2 (4.8-7.5) | 0.81 |
| Cholesterol (mg/dL) | 153 (127-188) | 155 (129-187) | 152 (125-190) | 0.71 |
| Baseline therapy | | | | |
| Diuretics | 797 (86.8%) | 400 (87.5%) | 397 (86.1%) | 0.55 |
| Betablockers | 793 (86.4%) | 395 (86.4%) | 398 (86.3%) | 0.96 |
| Antiplatelets | 596 (64.9%) | 298 (65.2%) | 298 (64.6%) | 0.86 |
| Anticoagulants | 228 (24.8%) | 109 (23.9%) | 119 (25.8%) | 0.49 |
| ACE inhibitors | 523 (57.0%) | 259 (56.7%) | 264 (57.3%) | 0.86 |

TABLE 2-continued

Patient population by derivation and validation cohorts

| Variable | All | Derivation cohort | Validation cohort | P |
|---|---|---|---|---|
| Aldosterone antagonists | 240 (26.1%) | 133 (29.1%) | 107 (23.2%) | 0.04 |
| ARBs | 196 (21.3%) | 100 (21.9%) | 96 (20.8%) | 0.70 |
| Ca-channel blockers | 75 (8.2%) | 36 (7.9%) | 39 (8.5%) | 0.75 |
| Statins | 553 (60.2%) | 286 (62.6%) | 267 (57.9%) | 0.15 |
| Amiodarone | 169 (18.4%) | 81 (17.7%) | 88 (19.1%) | 0.59 |

TABLE 3

HF prediction algorithm derivation

| Numerical processing of RM variable | Analysis interval | OR (CI) | P | Variable description |
|---|---|---|---|---|
| Univariate model | | | | |
| SHFM | Baseline | 1.32 (0.96-1.83) | 0.09 | |
| 24 h HR increase | 90 days | 1.04 (1.02-1.06) | <0.001 | |
| Resting HR increase | 45 days | 1.14 (1.06-1.22) | <0.001 | lowest 10 min average value during user-defined resting period (from 1 a.m. to 5 p.m.) |
| HRV decrease | 90 days | 1.16 (1.09-1.24) | <0.001 | daily standard deviation of 5-minute average atrial-atrial intervals recorded every 5 min |
| 24 h Activity decrease | 25 days | 1.04 (1.01-1.06) | 0.008 | assessed using an in-built accelerometer sensor and expressed in percent of 24 h |
| AF burden >0 | 7 days | 1.24 (1.06-1.46) | 0.008 | |
| PVC/day increase | 45 days | 1.17 (1.04-1.30) | 0.006 | |
| TI decrease | 90 days | 1.08 (1.04-1.12) | <0.001 | corresponding to changes in thoracic fluid levels. Impedance trend is calculated from daily averages of 24 subthreshold impedance measurements |
| Multivariable model | | | | |
| HF prediction index | 90 days | 2.73 (1.98-3.78) | <0.001 | |

The derivation of the HF prediction algorithm was based on numerical processing of temporal trends of daily sampled RM variables and the baseline SHFM value. Intervals before primary endpoint events (first post-implant HF hospitalization) were compared with same duration intervals selected randomly along temporal trends in patients without endpoint events. Comparisons were performed with univariate and multivariable logistic models having the primary endpoint as the dependent variable, and the numerically processed RM variable trends as independent variables. The reported ORs refer to the risk of HF hospitalization per unitary increase of the corresponding processed variable trend. Interval duration was optimized for individual variables, separately. The HF prediction algorithm was based on the multivariable model combining all 8 variables (the seven RM trends plus baseline SHFM).

AF: atrial fibrillation; HR: heart rate; HRV: Heart Rate Variability; OR: Odds Ratio; PVC: ventricular extrasystoles; RM: remote monitoring; SHFM: Seattle Heart Failure Monitor; TI: thoracic impedance

TABLE 4

Results of validation test

| Endpoint | Nominal cutoff | Sensitivity (CI) | Alert time (days) | False-alert rate (CI) | Absolute specificity |
|---|---|---|---|---|---|
| Primary: | 3.5 | 79.3% (60.3%-92.0%) | 77 (59-86) | 1.94 (1.85-2.03) | 85.8% |
| | 4.0 | 79.3% (60.3%-92.0%) | 69 (40-84) | 1.26 (1.19-1.34) | 90.4% |
| | 4.5 | 75.9% (56.5%-89.7%) | 66 (20-80) | 0.90 (0.85-0.97) | 93.5% |
| Secondary: | 3.5 | 77.4% (65.0%-87.1%) | 76 (43-86) | 2.00 (1.91-2.09) | 85.1% |
| | 4.0 | 75.8% (63.2%-85.8%) | 72 (40-85) | 1.31 (1.24-1.38) | 89.9% |
| | 4.5 | 74.2% (61.5%-84.5%) | 66 (20-84) | 0.95 (0.89-1.01) | 93.0% |

Results of validation test of the HF prediction algorithm on primary and secondary endpoints by nominal cutoffs. False-alert rates are reported as number of events per patient-year. Absolute specificity is reported the percentage of days free from algorithm inappropriate active states. Alert times are relative appropriate detections within maximum prediction time of 90 days, and are reported as median (interquartile range). CI: 95% confidence interval The features disclosed in regard with the system may also apply to the method and vice versa.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

LIST OF REFERENCE NUMERALS

1 Implantable medical device
2 Patient device (patient remote)
3 Processing device (server)
4 Clinician device
A, B Line
I Interval
K Stability bound
L Interval length
M Average
nW Data points
P Patient
s Series of data points
SR Stability range
TH Threshold
W1-4 Observation window

The invention claimed is:

1. System for predicting heart failure hospitalization, comprising:
an implantable medical device configured to determine one or more cardiac characteristic parameters and/or a patient activity parameter,
a processing device configured to process data derived from signals sensed by the implantable medical device, said processing including identifying intervals (I) in a series of data points containing monotonically increasing and/or decreasing values related to a mean ventricular heart rate, a heart rate variability, and/or a thoracic impedance,
wherein the processing device is configured to process variables associated with the series of data points containing monotonically increasing and/or decreasing values and which relate to different cardiac characteristics and/or a patient activity to obtain a multiplicity of processed variables, and to combine said processed variables using a mathematical model to compute a heart failure prediction index.

2. System according to claim 1, wherein said variables relate to at least a subset of a mean ventricular heart rate parameter, a mean number of extrasystoles parameter, a mean ventricular heart rate at rest parameter, a burden of atrial arrhythmias parameter, a heart rate variability parameter, a patient activity parameter, and a thoracic impedance parameter.

3. System according to claim 1, wherein for processing a particular variable of said variables, the processing device is configured to process a series(s) of data points (nW) derived from the signals sensed by the implantable medical device.

4. System according to claim 3, wherein the processing device is configured, for the processing, to apply a moving average filter to the series(s) of data points (nW).

5. System according to claim 1, wherein the processing device is configured, for the processing, to also determine a slope for data points within an interval of the intervals (I), determine a number of data points within the interval which fall outside a stability range, and/or determine a number of data points within the interval which exceed a predefined threshold (TH).

6. System according to claim 1, wherein a series(s) of data points (nW) of a first variable relating to a mean ventricular heart rate parameter is processed to obtain a first processed variable by identifying at least one interval within intervals (I) in a series(s) of data points (nW) containing monotonically increasing values, satisfying a condition $s_i \geq s_{i+1} \geq s_{i+2} \geq \ldots \geq s_{i+L-1}$, wherein $s_i \ldots s_{i+L-1}$ are data points in the at least one interval having a length of L data points.

7. System according to claim 1, wherein a series(s) of data points (nW) of a second variable relating to a mean number of ventricular extrasystoles parameter is processed to obtain a second processed variable by computing a slope of data points in at least one interval within intervals (I).

8. System according to claim 1, wherein a series(s) of data points (nW) of a third variable relating to a mean ventricular heart rate at rest parameter is processed to obtain a third processed variable by determining a number of data points within at least one interval within intervals (I) which fall outside a stability range (SR) associated with the at least one interval.

9. System according to claim 1, wherein a series(s) of data points (nW) of a fourth variable relating to a burden of atrial arrhythmias parameter is processed to obtain a fourth processed variable by determining a number of data points within at least one interval of intervals (I) which exceed a predefined threshold (TH).

10. System according to claim 1, wherein a series(s) of data points (nW) of a fifth variable relating to a heart rate variability parameter is processed to obtain a fifth processed variable by identifying at least one interval within intervals (I) in a series(s) of data points (nW) containing monotonically decreasing values, satisfying a condition $s_i \leq s_{i+1} \leq s_{i+2} \leq \ldots \leq s_{i+L-1}$, wherein $s_i \ldots s_{i+L-1}$ are data points in the at least one interval having a length of L data points.

11. System according to claim 1, wherein a series(s) of data points (nW) of a sixth variable relating to a patient activity parameter is processed to obtain a sixth processed variable by computing a slope of data points in at least one interval of intervals (I).

12. System according to claim 1, wherein a series(s) of data points (nW) of a seventh variable relating to a thoracic impedance parameter is processed to obtain a seventh processed variable by identifying at least one interval within intervals (I) in a series(s) of data points (nW) containing monotonically decreasing values, satisfying a condition $s_i \leq s_{i+1} \leq s_{i+2} \leq \ldots \leq s_{i+L-1}$, wherein $s_i \ldots s_{i+L-1}$ are data points in the at least one interval having a length of L data points.

13. System according to claim 1, wherein said mathematical model is a linear combination of said processed variables, wherein within the linear combination each processed variable is multiplied by an associated coefficient.

14. System according to claim 13, wherein the processing device is configured to determine a Seattle Heart Failure Model (SHFM) score and to include the SHFM score in the linear combination.

15. Method for predicting heart failure hospitalization, comprising:
  determining one or more cardiac characteristic parameters and/or a patient activity parameters,
  processing data derived from signals sensed by an implantable medical device, said processing including identifying intervals (I) in a series of data points containing monotonically increasing and/or decreasing values related to a mean ventricular heart rate, a heart rate variability, and/or a thoracic impedance,
  wherein the step of processing data comprises processing variables associated with the series of data points containing monotonically increasing and/or decreasing values and which relate to different cardiac characteristics and/or a patient activity to obtain a multiplicity of processed variables, and combining said processed variables using a mathematical model to compute a heart failure prediction index.

* * * * *